United States Patent [19]

Anderson

[11] 4,231,071

[45] Oct. 28, 1980

[54] READER FOR DATA RECORDED ON MAGNETIC DISKS AT PLURAL DENSITIES

[75] Inventor: Albert L. Anderson, Lexington, Mass.

[73] Assignee: Digital Equipment Corporation, Maynard, Mass.

[21] Appl. No.: 925,534

[22] Filed: Jul. 17, 1978

[51] Int. Cl.³ .............................................. G11B 5/09
[52] U.S. Cl. ........................................ 360/40; 360/51
[58] Field of Search ....................... 360/40, 48, 50, 51, 360/27, 39

[56] References Cited

U.S. PATENT DOCUMENTS

| | | | |
|---|---|---|---|
| 3,222,659 | 12/1965 | Skov | 360/48 |
| 3,689,903 | 9/1972 | Agrawala et al. | 360/51 |
| 3,753,143 | 8/1973 | Aguirre | 360/51 |
| 3,778,793 | 12/1973 | Hayashi et al. | 360/51 |
| 3,810,234 | 5/1974 | Monett | 360/51 |
| 3,864,740 | 2/1975 | Sordello et al. | 360/27 |
| 3,898,580 | 8/1975 | Millsap | 360/51 |
| 3,922,613 | 11/1975 | Allen et al. | 360/27 |
| 3,940,790 | 2/1976 | Conroy et al. | 360/39 |
| 3,944,940 | 3/1976 | Desai | 360/51 |
| 3,947,876 | 3/1976 | Gray | 360/40 |
| 4,151,565 | 4/1979 | Mazzola | 360/40 |

FOREIGN PATENT DOCUMENTS

| | | |
|---|---|---|
| 1,265,129 | 3/1972 | United Kingdom. |
| 1,343,142 | 1/1974 | United Kingdom. |

OTHER PUBLICATIONS

"DNC File Memories" by H. J. McLaughlin, Instruments & Control Systems, 11/61, vol. 34, pp. 2063 through 2068.

*Primary Examiner*—Vincent P. Canney
*Attorney, Agent, or Firm*—Cesari & McKenna

[57] ABSTRACT

Apparatus for reading data from a rotating magnetic disk whereon data has been recorded at either "single" or "double" density rate, or at both rates on different sectors of the same disk. Density rate information is used to control the frequency of a timing signal generated by a phase locked loop (PLL). The PLL times the reading of data according to a synchronizing signal recorded on the disk. To accommodate the bit shift associated with such plural density data recording, the phase locked loop is provided with a dual gain low pass filter. A high gain is used in the phase locked loop filter until lock-in is achieved, to increase acquisition range and reduce acquisition time; the gain of the loop filter is reduced upon acquisition, to provide a greater lock-in range and to reduce system sensitivity to bit shift of the data, thereby obviating the need for pre-compensation of the bit recording positions.

19 Claims, 9 Drawing Figures

READER FOR DATA RECORDED ON MAGNETIC DISKS AT PLURAL DENSITIES

BACKGROUND OF THE INVENTION

1. Field of the Invention

This invention relates to the field of information storage and retrieval and, more particularly, to the recording of binary data in a magnetic medium.

The invention is directed to track-sector formatted binary recording on rotating magnetic disks. A system is shown which automatically reads both single and double density rate recordings. This system will read disks recorded entirely at the so-called "single" density rate, entirely at the so-called "double" density rate or partially at single density and partly at double density.

2. Prior Art

Various systems are known in the prior art for recording binary data on magnetic media. The recording of binary data on rotating magnetic disks using a sector-track format is conventional. In such systems, magnetic read/write heads are used to transfer data onto and off of the rotating disk. The disk is divided into a number of concentric tracks each having a plurality of distinct segments or sectors comprising identifiable regions where data may be recorded. Information is stored on the disk as a series of magnetic flux reversals, at normally specific positions within the sectors. Accurate positional synchronization of the read and write operations is therefore required for accurately extracting information from the flux reversals. For this reason, a "clock" or synchronizing signal is recorded together with the data. In the reading operation, a phase locked loop (PLL) is employed to detect and lock onto the synchronizing signal, to generate an internal time-base reference so that desired data may be read from the correct position on the disk.

Prior disk readers have been able to read and decode (on any one pass of the disk) at only a single recording density for all data fields on the disk,—e.g., either single or double density recordings. None of the prior art disk recording systems have, to my knowledge, provided the capability of reading disks which are recorded at a first density on a first sector and recorded at a second density, on a second sector without requiring two passes (i.e., one for each density rate).

This is due at least in part to the problems caused by bit shift. Due to the interaction of the closely spaced magnetic fields arranged on the recording tracks of a disk, a binary symbol, e.g., a binary "1", may actually be recorded on the disk at a position slightly different from the one at which the recording head is instructed to write the information. For example, the flux reversals corresponding to two adjacent "1's" may tend either to repel or attract each other. This effect is known as "bit shift." A disk recording system, to provide reliable data recovery, must be able to accommodate bit shift. Even when a phase locked loop is used to track the recorded information during the read operation, bit shift can cause problems. Primarily, an excessive amount of bit shift will cause the PLL to lose phase lock. In the past, the effect of bit shift has been minimized by a technique known as pre-compensation. That is, for each bit the amount of bit shift is predicted (from an examination of the bit pattern of the data being recorded) and the recording system is adjusts or compensates therefor. Thus the recording head is provided with a signal to be recorded when it is at a position which is shifted from the nominal bit recording position by an amount equal to and oppositely directed from the predicted bit shift; theoretically, the bit is thereby written in the nominal position it was actually intended to occupy, as if there had been no bit shift. To perform this operation, prior art PLL disk reading systems have required complex pre-compensation circuitry. And, even with such pre-compensation circuitry, some bit shift will still occur; and excessive bit shift will therefore still cause the PLL to lose lock. Reducing the gain of the PLL increases its ability to maintain lock in the presence of a greater amount of bit shift, by increasing its lock-in range. As used herein, lock-in refers to the range over which phase lock is maintained by the PLL after having been initially acquired. However, decreased loop gain also increases acquisition time—the time that the loop requires for phase locking on the data being tracked. Yet acquisition time must be limited, since the number of bits available for acquisition is limited, to make efficient use of the storage medium. In prior art designs, therefore, PLL gain has been constrained to fall within a limited range in order to provide both rapid acquisition and a capture range adequate to accommodate at least modest amounts of bit shift. These constraints have thus far been obstacles to the design of a practical disk reader with PLL dynamic performance adequate to automatically accommodate disks having data fields recorded at both single and double density rates.

Accordingly, it is an object of the present invention to provide a reader for data recorded on magnetic disks at both single and double densities, including disks having some sectors recorded at the single density rate and other sectors at the double density rate.

It is another object of the present invention to provide a PLL for a magnetic disk reader capable of reading data recorded at both single and double density rates which obviates the need for pre-compensation to avoid bit shift.

It is a further object of the present invention to provide, in a magnetic disk reader, a phase locked loop having an automatically adjustable loop gain responsive to the function being performed by the loop (i.e., operation in acquisition or lock-in tracking mode).

Yet another object of the present invention is the provision of a magnetic disk recorder employing a phase locked loop having a short acquisition time together with a wide capture range.

Still other and further objects of the present invention will be apparent to those skilled in the art from the description of the present invention provided herein.

BRIEF SUMMARY OF THE INVENTION

The foregoing and other objects of the present invention are accomplished by a magnetic disk reader system as particularly disclosed herein. This system is intended for the reading of magnetic disks having data recorded in a track-sector format. The term "disk" is intended to include so-called "floppy" disks or diskettes as well as basic, rigid disks. The data may be recorded on the disk all at the "single" density rate, all at the "double" density rate, or some at each of those rates, intermixed.

In track-sector formatted disk recording systems, each sector of each track is divided into two sections or fields: a header field and a data field. In turn, each of these fields is associated with a preceding preamble. Thus, each sector is comprised of a first preamble, a header field, a second preamble, and a data field. The preambles are both the same, in general, and comprise a particularly formatted sequence of bits used by the PLL for acquiring lock-in. For purposes of insuring cross-capatibility, the preambles are generally based on an industry standard format which is widely accepted. The header field preamble permits the PLL to synchronize with the output of the read head to enable the header field to be read. The header field contains information identifying the particular track and sector with which it and the accompanying data field are associated. Because the header field and the data field may be written by different machines and possibly at slightly different frequencies, they may easily be out-of-phase with each other. The data field preamble allows the PLL to adjust to any such phase discrepancy or difference. A mark following each preamble is used to indicate the nature of the ensuing field.

Broadly, this invention involves the use and control of a variable gain PLL to synchronize the reading of data with the positions of the recorded bits. The PLL has a dual gain (low-pass) loop filter for providing dual gain loop operation. A first, high gain is used in the loop filter to enable rapid synchronization with i.e., (acquisition of the phase of) the data. Once lock-in has been achieved, the gain of the loop filter is decreased so that excessive bit shift will not easily cause the loop to loose lock. In other words, this is a rapid acquisition (high gain, wide acquisition range) PLL with a lock-in range which is initially low during acquisition and then increases after lock-in has been acquired.

A preamble detector detects the presence of a preamble and in response thereto places the PLL in the high gain, fast lock mode. At the end of the preamble, PLL gain is decreased to the low gain, wide lock-in range amount.

The PLL also provides a synchronization (i.e., clock) signal at one of two different rates—one rate for reading single density data and another, faster rate for reading double density data. The system controller, responsive to a control program, supplies a signal which chooses, for each data field, the appropriate rate for the clock signal supplied by the PLL.

Also, since the mixture of recording densities can lead to the false detection of header fields, the reader is preferably employed in conjunction with my new double density encoding technique disclosed in my commonly assigned U.S. Pat. application Ser. No. 925,596, entitled "Technique for Recording Data on Magnetic Disks at Plural Densities," filed on even date herewith.

BRIEF DESCRIPTION OF THE DRAWINGS

These and other features of the present invention will be more fully understood by reference to the detailed description below and the accompanying drawing of which.

DETAILED DESCRIPTION OF A PREFERRED EMBODIMENT

Figure 1:
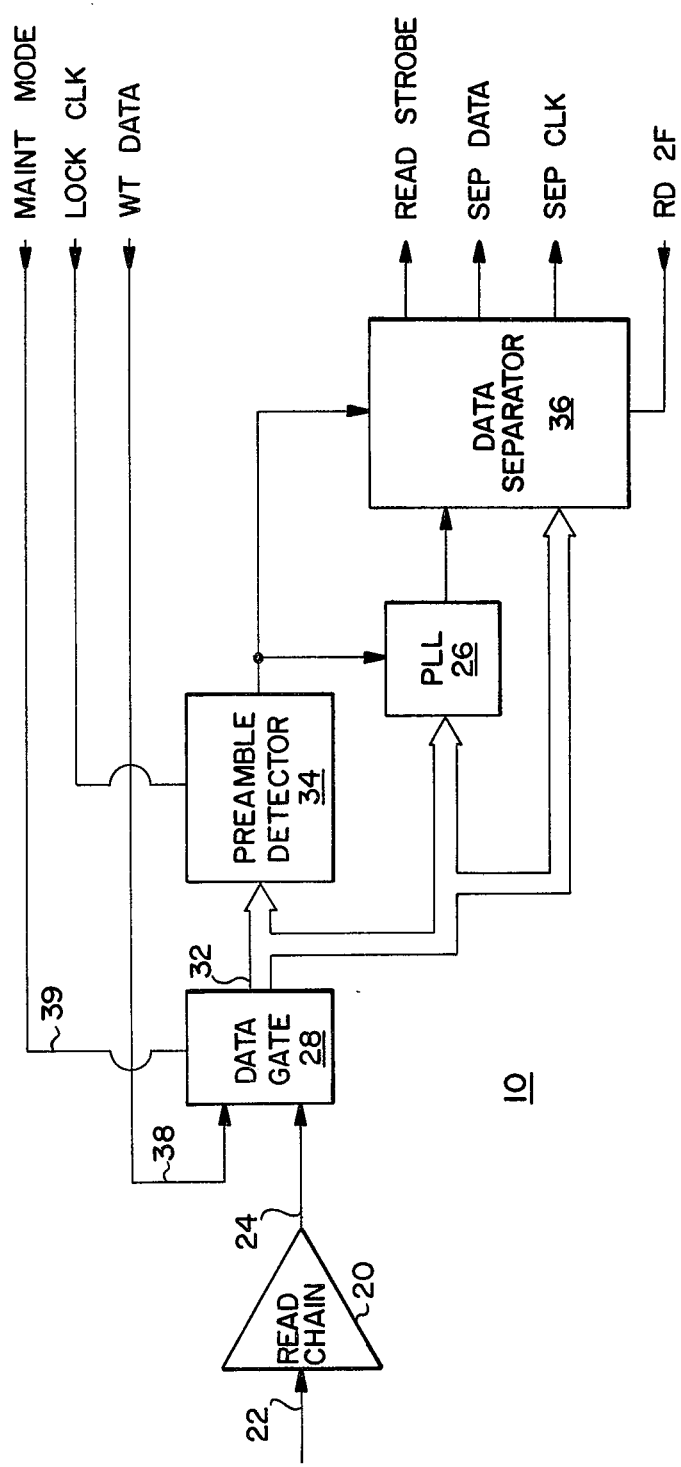
FIG. 1 is a block diagram of a disk card reader according to the present invention.

Referring now to FIG. 1, there is shown in block diagram form the disk reader 10 of the present invention. A read chain 20 receives an analog signal on an input lead 22 from a read head (not shown). The read chain 20 amplifies and normalizes the signal provided by the read head to provide a digital output signal on a line 24. The digital output signal of the read chain corresponds to the digital signal recorded on the disk. Since data is recorded on the disk only at specific positions, corresponding to specific times with respect to the read chain output signal, it is necessary to develop a reference time base to enable the recorded data to be synchronously read. For this reason, timing information is recorded together with data, by interleaving a stream of synchronizing bits with the data bits; the timing of the synchronizing bit stream is recovered by a phase locked loop (PLL) 26.

The digital output of read chain 20 is supplied to the PLL 26 via a data gate 28. The data gate is a conventional element in such systems and is utilized for the purpose of performing a maintenance-type check on the system. The data gate receives two inputs—one input on line 24 from the read chain 20 and another input on line 38 for supplying a test signal (WT DATA) thereon. The output of the data gate (on line 32) comprises either the signal on line 24 or the signal on line 38, depending on the state of a control signal applied to the data gate on control lead 39. This output signal data is supplied to the phase locked loop 26, preamble detector 34 and data separator 36. The function of each of these building blocks will be explained in greater detail below.

For controlling the dual-gain PLL, the preamble detector 34 provides a pair of control signals in response to which the PLL selects either the high-gain or low-gain mode of operation or becomes quiescent (i.e., disabled or inhibited). Indicative of its function, the high-gain mode of PLL operation is referred to as the "fast lock" mode. The first control signal from the preamble detector determines whether the PLL operates in the fast lock mode. Thus, it is referred to as the FAST LOCK signal. When the FAST LOCK signal is a binary "1" or high, for example, the PLL operates in the fast lock mode; when the FAST LOCK signal is a binary "0" or low, however, the PLL switches to the low-gain, wide capture range mode. The second PLL control signal is referred to as the INHIBIT signal. When this signal is high, the PLL oscillator (VCO) is turned off—inhibited—and the PLL phase comparator is initialized to indicate zero phase error. Thus, the INHIBIT signal determines when the PLL will operate and the FAST LOCK signal controls the dynamic performance of the loop.

While the preamble format need not be any particular bit pattern, to ensure cross-compatibility (i.e., the ability of one system to read disks recorded on another system), standard preambles are generally employed. For example, under current industry standards for floppy disk or diskette systems, the preamble will generally be six 8-bit bytes of binary "0". To provide a margin for safety, the present preamble detector 34 is thus designed to indicate that it has found a preamble when it has detected four contiguous bytes of zeros. More particularly, as soon as the preamble detector has found a first, single byte of zeros, it drops the INHIBIT signal low, causing the PLL oscillator to start running. The phase locked loop operates initially in fast lock mode (i.e., with the FAST LOCK signal high) and should obtain lock within the next three subsequent bytes of zeros. At the end of the fourth byte of zeros, it is assumed that the PLL has acquired phase lock and data separator 36 is initialized to begin operation. The data separator strips the data bits from the composite signal read off of the disk. This composite signal is comprised of interleaved streams of data (or "information") bits and synchronizing (or "clock") bits. The FAST LOCK signal is released (i.e., goes low) at the end of the fourth byte of the preamble, permitting the PLL to switch over to low gain operation.

Figure 2:
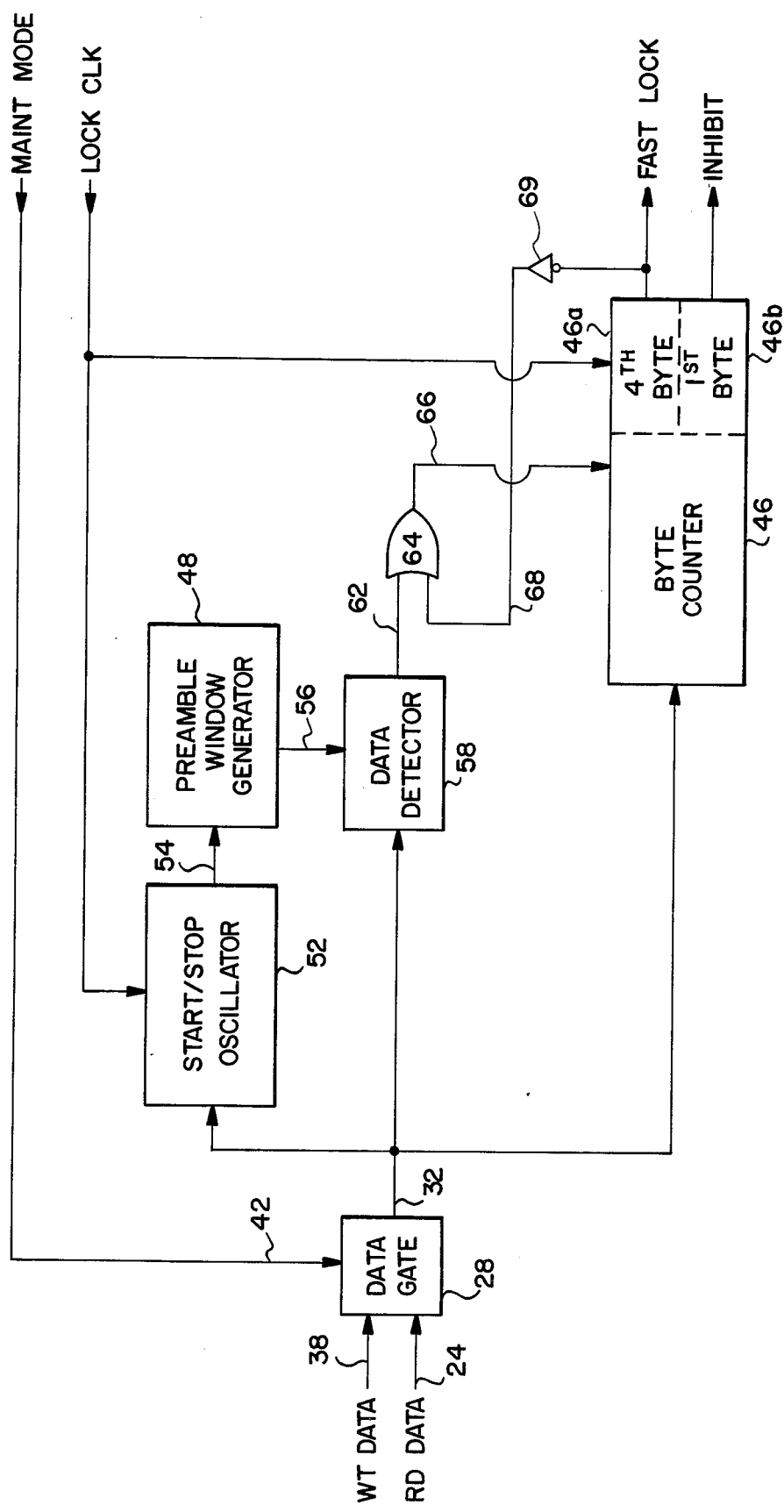
FIG. 2 is a block diagram of the preamble detector of the disk reader of FIG. 1.
Figure 3:
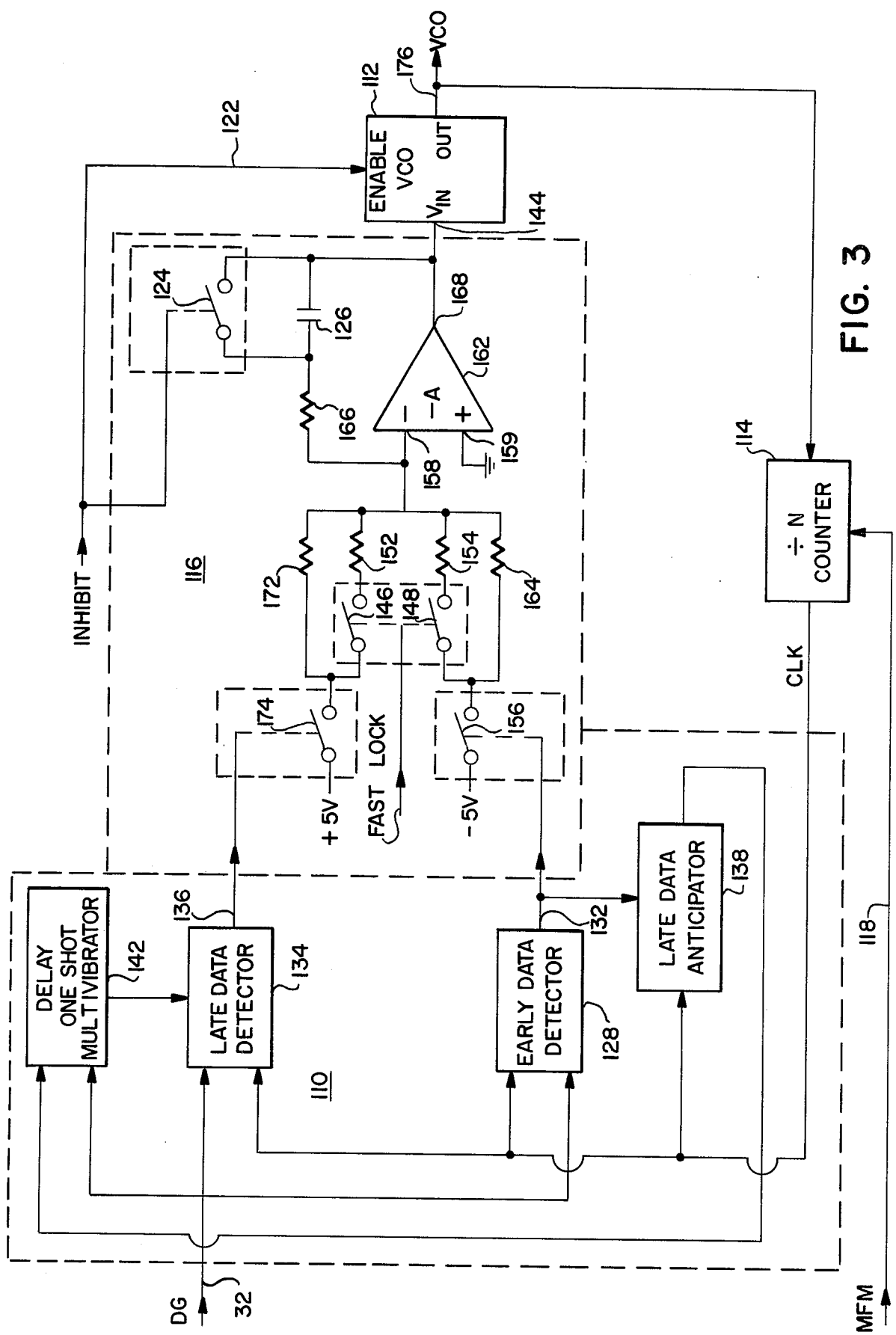
FIG. 3 is a block diagram of the phase locked loop of the disk reader of FIG. 1.
Figure 4:
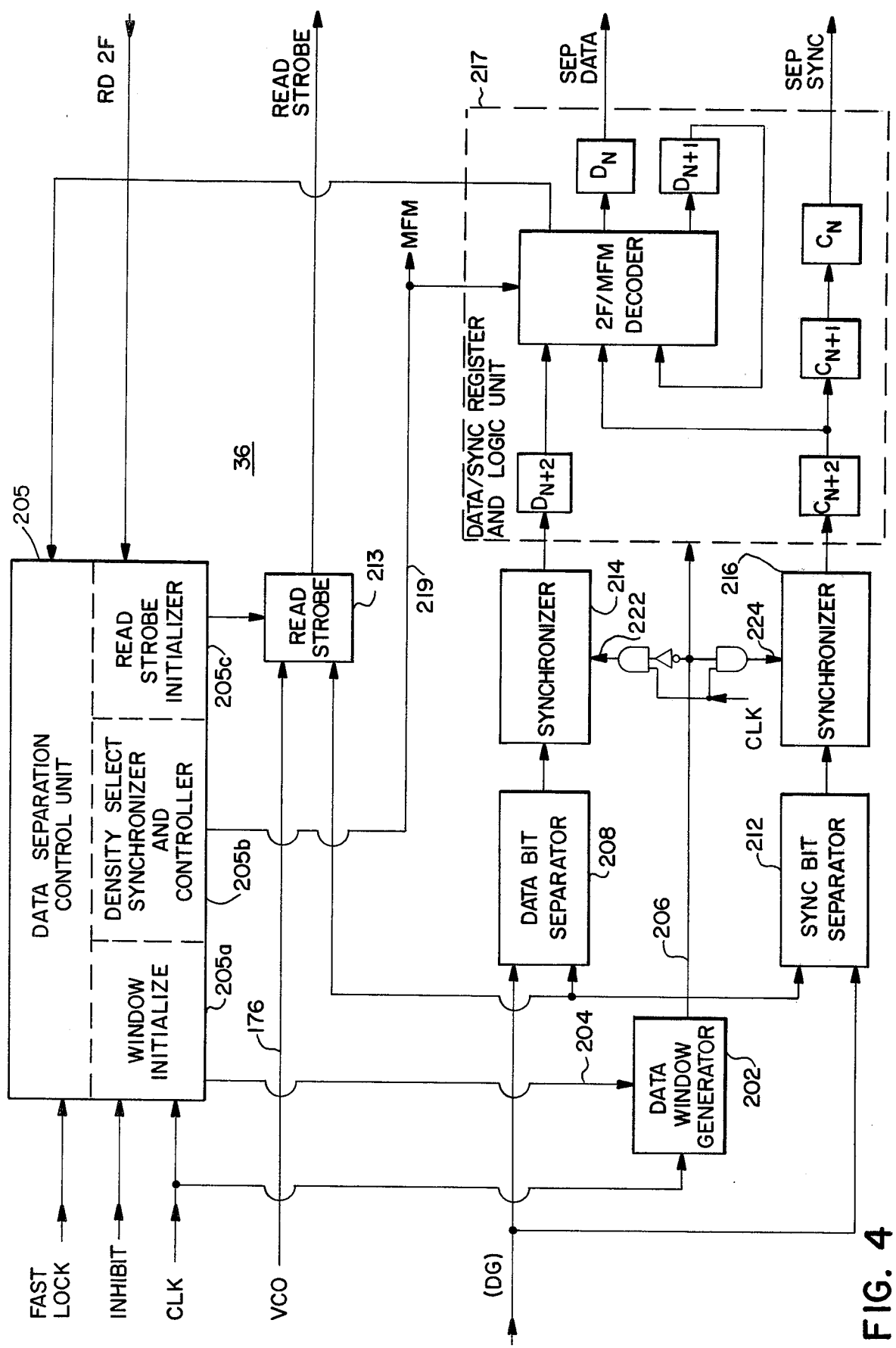
FIG. 4 is a block diagram of the data separator of the disk reader of FIG. 1.

FIGS. 2-4 provide slightly more detailed block diagrams of the preamble detector, phase locked loop and data separator, respectively. Their circuit diagrams are shown in corresponding FIGS. 5-7, respectively.

Data gate 28, while not necessary for the data reading operation per se, is provided to permit a maintenance type of check of the preamble detector, PLL and data separator by permitting the reader to operate on a special test sequence bit pattern of known properties, rather than the actual (unknown) "data" from the magnetic disk. As shown in FIG. 2, two signals are provided to data gate 28, on lines 24 and 38. Responsive to the state of the data gate control signal ("MAINT MODE") on line 42, data gate 28 provides at its output, line 32, either the signal on line 24 or the signal on line 38. The former is the digitized read signal output from read chain 20, RD DATA, while the latter is the aforementioned special test signal, WT DATA.

The preamble detector receives the output of data gate 28 and checks for the presence of a preamble bit pattern. For example, with a standard preamble format consisting of six 8-bit bytes of zeros, the preamble detector is designed to verify the presence of a preamble upon the detection of four bytes of zeros. As above noted, the preamble detector provides the INHIBIT signal and the FAST LOCK signal. Both of these signals are used to control the operation of the PLL 26. The phase locked loop, as is usual, includes a voltage controlled oscillator (VCO) for generating an internal clock (i.e., synchronizing) signal whose phase is compared with and kept locked onto the synchronizing signal read from the disk. The output of data gate 28 is supplied within the preamble detector to a byte counter 46. The byte counter more particularly comprises a first byte counter 46a and a fourth byte counter 46b. When the first byte counter 46a detects a first byte of all zeros, the INHIBIT signal is brought low, to permit the VCO to begin running. The FAST LOCK signal is high at this time, to put the PLL into the high-gain, acquisition mode. This continues for the next three bytes at which time, if four consecutive bytes of zero have been detected, the FAST LOCK signal (that is, the output of fourth byte counter 46b) becomes low, switching the PLL to the low-gain, capture mode.

If, during the three bytes following the first zero byte a high bit is detected, byte counter 46 is reinitialized to a count of zero, since the high bit is an indication that a preamble has been falsely assumed. The operation then continues as set forth above, searching again for the preamble.

Even with double density recorded data fields, the preamble and header field are recorded at the single density rate. The user, in response to knowledge about how the data was recorded for particular track-sectors, provides a control signal indicating whether the data field which follows should be read as a single or double density recording. Regardless of which density rate was employed, the first step for recovering any recorded data is to achieve synchronization with the recording. Then, the data (i.e., information) bits may be separated from the timing bits. For example, preamble detection requires the sensing of 48 contiguous information bits all of which are in the binary 0 state. If the synchronizing bits were not read separately from the information-containing bits, the pattern read might have both 1's and 0's rather than just 0's.

Since there is a degree of uncertainty in the timing of the data bits read from the disk, even after synchronizing with the timing bits (due to speed fluctuations and bit shift, for example), a "window" (i.e., gating signal) is generated when information bits are normally expected, to separate synchronizing bits from data bits and permit the byte counter to "count" only data bits. Any bit falling within this window in time is presumptively read as an information bit, rather than as a synchronizing bit; any bit falling outside the window is ignored. Nominally, the period between leading edges of synchronizing bits or between leading edges of information bits is about 4 microseconds, by industry standards. Thus, the leading edge of a data bit, but for any timing inaccuracy, will lie about 2 microseconds away from the leading edge of a synchronizing bit. In the presence of a valid preamble, all bits in the 1 state must be synchronizing bits, since all information bits must be 0. The data window generator 48, therefore, generates a window signal some 3 microseconds long starting one-half microsecond after the leading edge of a high bit. The byte counter 46 evaluates the logic level of the read chain output signal during the window and indexes its bit count only if a low level is present. A high level at any time during the window interval negates the assumption of a preamble and resets the byte counter.

Figure 5:
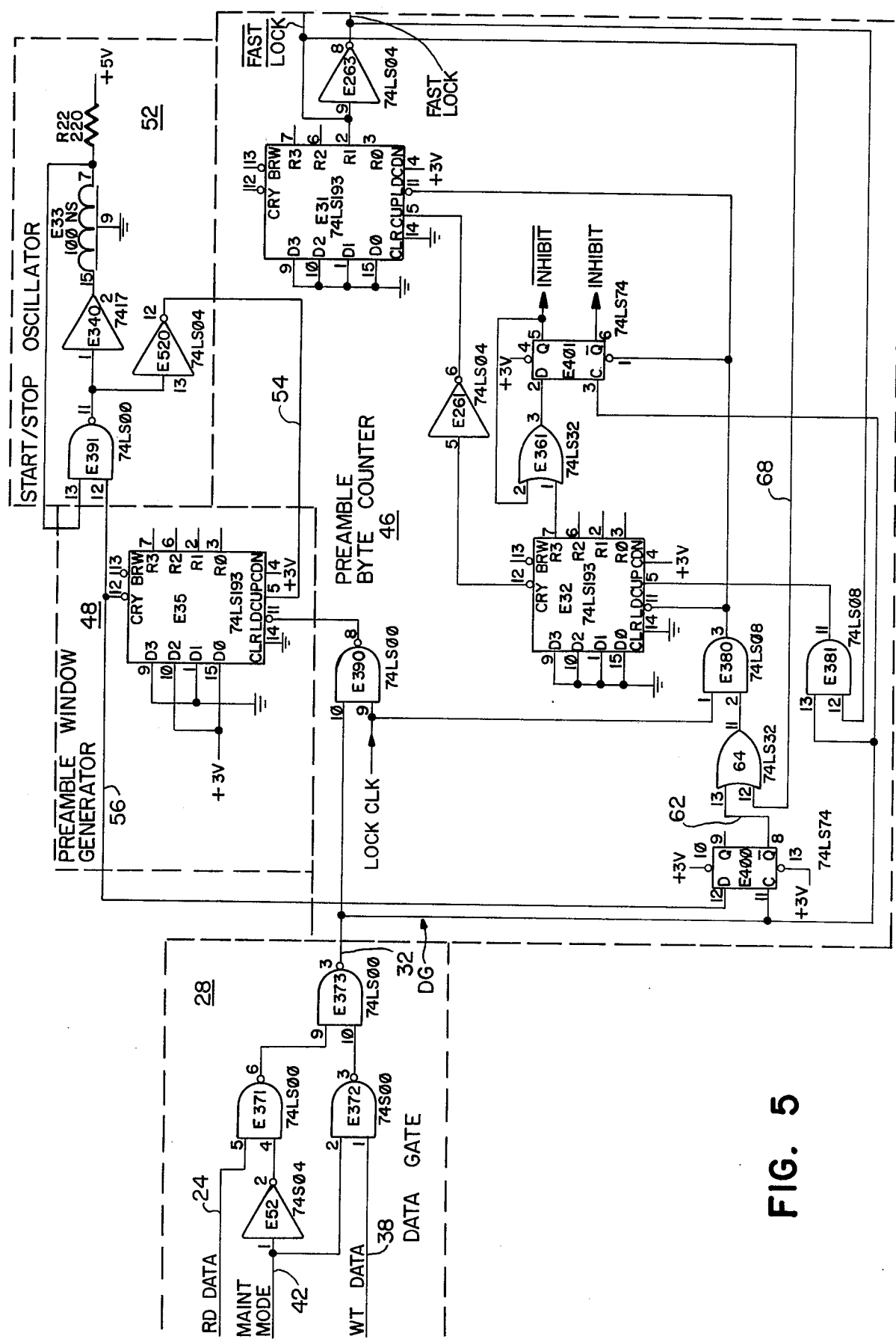
FIG. 5 is a schematic circuit diagram of the preamble detector of FIG. 2.

To ensure accurate control of window timing, data window generator 48 is driven by a relatively high-speed start/stop oscillator 52. For example, oscillator 52 may operate at a nominal frequency of about 5 MHz. To avoid the necessity for adjustments and to provide an accurate time base for the window, a delay-line oscillator (as shown in FIG. 5) is well suited for this application. Oscillator 52 receives as a control input the output of data gate 38 on line 32. In response to a low-to-high (synchronizing bit) transition on line 32, oscillator 52 starts oscillating and supplying an oscillatory output on line 54. The output of oscillator 52 is supplied to the input terminal of preamble window generator 48 which then provides a window (gating) signal, on line 56, to data detector 58. As above stated, the gating signal on line 56, referred to as the preamble bit window signal, is high for a period of about 3 microseconds centered 2 microseconds following the leading edge of the synchronizing bit which started the oscillator running.

Data detector 58 also receives the output of data gate 28 on line 32. If at any time while the preamble bit window signal is present a high signal is received on line 32, the output line 62 of data detector 58 will carry a high level, to indicate that a "1" has been detected in an information bit, negating the possibility that the prior string of 0's is part of a preamble. Because the period between successive synchronizing bit pulses is about 4 microseconds, the preamble bit window signal essentially occupies most of that interval, excluding the synchronizing bit itself, and ensures that a data bit shifted by even a considerable amount is nevertheless properly detected as a data bit rather than as a synchronizing bit, thereby decreasing the probability of false or improper detection of a preamble.

Byte counter 46 indexes upward by a count of 1, starting at zero, each time a high bit is received from data gate 28. OR gate 64, which receives as one of its inputs the signal on line 62 from data detector 58, will provide a high output on line 66 whenever the data detector finds a "1" during a data bit period (i.e., during the preamble window signal) following the transition which started oscillator 52. This high signal on line 66 is used to reset the byte counter to 0. Upon being reset, the preamble detector merely starts counting 0's again, in search of a preamble. The reset signal applied to byte counter 46 through OR gate 64 can also be generated by a high on line 68, the other input to OR gate 64. Line 68 is connected, through an inverter 69, to that output of byte counter 46 (and, particularly, of fourth byte counter 46b) which provides the FAST LOCK signal; since the FAST LOCK signal goes low upon the detection of a preamble, this automatically disables the preamble detector until it is reset by the LOCK CLK signal going low.

A partially block, partially schematic diagram of PLL 26 is provided in FIG. 3, to which reference is now made. The input signal with respect to which the PLL is intended to phase lock is the output signal on line 32 from data gate 28, DG. This signal (i.e., DG) is applied to the phase error detector (or phase comparator) 110. The phase error detector also receives a signal derived from the VCO 112; this signal is the output of a divide-by-N (÷N) counter 114 which receives the VCO output signal as its input. The output signal from the the divide-by-N counter, designated CLK, is compared with DG by the phase error detector 110, to provide the phase error input signal to the PLL (low pass) loop filter 116.

Because the data signal DG may comprise either single or double density recorded information and the PLL must be able to respond to both, it is necessary that the VCO be operated at a high enough frequency to track the double density data. Also, since the VCO output is used directly for other window-generating functions to be subsequently described, the VCO frequency must be at least twice the double density data frequency. Since this, in turn, is twice the frequency of single density data, the VCO must operate at a frequency least 4 times than that of single density data. Accordingly, the VCO is operated at 4 times the frequency of single density data and the divide-by-N counter 114 operates with the division factor N equal to either 2 or 4, respectively, for double and single density data. A control signal labeled MFM is provided on line 118 for controlling the divide-by-N counter to select the division factor of N=2 or N=4. When the signal MFM is high, double density data recorded in a Modified FM (MFM) format is to be decoded; when MFM is low, single density data is to be decoded. The MFM signal is provided by the density select synchronization in the data separation control unit 205 of the data separator (see FIG. 4), in response to the RD 2F signal received from the system controller (not shown). Software instructions from the control program tell the system whether the data to be read was recorded at the single density rate or at the double funsity rate. In response, the RD 2F signal is generated, to control the state of the MFM signal.

The INHIBIT signal from the preamble detector is provided to the PLL, for controlling the VCO, via line 122. When the INHIBIT signal is high, the VCO is stopped (i.e., inhibited). At the same time, a controlled switch 124, responsive to the INHIBIT signal, closes shorting out and discharging the PLL loop filter capacitor 126. Consequently, when the INHIBIT signal goes low, to permit the VCO to start running, controlled switch 124 is opened and permits the loop filter to start up with an indication or assumption of zero phase error; thus, on the second bit, the output of the phase error detector represents the actual phase error. This avoids the possibility of the PLL starting up with VCO control signal unrelated to the actual phase difference between the CLK signal and the DG signal being read out of the read chain.

The phase error detector separately determines, for each data bit, whether it arrives later than it should have (termed a plus or "+" phase error), whether it arrives earlier than it should have (termed a minus or "−" phase error), whether there is no phase error, and whether the data bit is entirely missing. In the latter two events, no phase error signal is produced for that bit.

To detect early data bits, early data detector 128 receives signals DG and CLK at its input and produces at its output 132 a signal which is normally low and which goes high on the leading edge of an early data bit (i.e., one which precedes the related bit of the CLK signal); this signal remains high until the leading edge of the corresponding CLK signal bit, at which time it returns to its normal low condition.

The late data detector 134 is the counterpart of early data detector 128 bits does not, however, merely perform a mirror operation. When a data bit arrives early, one thing is certain—namely, the data bit is present. However, the possibility exists when a data bit does not arrive at the expected time that such bit will not arrive at all, for any number of reasons. This possibility must be taken into account lest the output signal 136 of the late data detector provide an extremely large phase error signal which totally is erroneous. To account for this eventuality, late data anticipator 138 and delay one-shot multivibrator 142 are provided; these elements are used to control the late data detector 134 so that an output is provided thereby only when the late data bit finally arrives. If the "late" data bit is actually missing, no error signal is provided at the output of late data detector 134, permitting the VCO to "flywheel" without changing phase.

The low-pass filter 116 of the PLL accepts the digital phase error signal provided on lines 132 and 136 as well as the FAST LOCK signal and from these provides an analog signal for driving the frequency control input 132 of VCO 112. As mentioned above, loop filter 116 is a dual gain low-pass filter. When the FAST LOCK signal is low, switches 146 and 148 are open, so that resistors 152 and 154 are out of the circuit. If the data is early, the VCO is running at too low a frequency. To raise the frequency, the phase error signal on line 132 causes switch 156 to close, connecting the inverting input 158 of operational amplifier 162 to a −5 volt source through resistor 164. Correspondingly, if the data is late, the VCO is running at too high a frequency. To lower the frequency, a late data phase error signal on line 136 closes switch 174 and causes the inverting input of operational amplifier 162 to be connected to the +5 volt source through resistor 172. The noninverting input 159 of amplifier of 162 is grounded, and its output 168 is connected through capacitor 126 and resistor 166, in a series feedback path, to the inverting input 158. Designating the resistance value of resistor 166 as R1 and the value of resistors 164 and 172 as R2 (i.e., for symmetry purposes, these two resistors are equal in value), then the loop filter has gain −R1/R2 for times short compared to the time constant of resistor 166 and capacitor 126.

With switch 166 closed (i.e., early data), a negative voltage is supplied to the inverting input terminal 158 of the operational amplifier. This causes a positive voltage to appear at the output 168 of the loop filter and the input terminal 144 of the VCO. The positive voltage on the VCO input (i.e., frequency control) terminal causes the output of the VCO to increase in frequency. Conversely, with switch 174 closed (i.e., late data), a positive voltage is supplied to the inverting input terminal of the operational amplifier. This causes a negative voltage to appear at the VCO input, thus driving down the frequency of the VCO output.

When the FAST LOCK signal is present (i.e., high), switches 146 and 148 are closed, placing resistors 152 and 154 in parallel with resistors 172 and 164, respectively. Consequently, loop filter gain increases. If resistors 152 and 154 each have a value R3, then the amplifier gain is −R1/R4 where R4 indicates the effective parallel resistance of R2 and R3, i.e., R4=(R2×R3)/(R2+R3). Typically, R3 maybe about one-fourth the value of R2. Thus, loop gain in the fast lock mode will be about 5 times the loop gain in the lock-in low-gain mode. The high gain used for aquisition of phase lock is higher than the normal gain of single gain PLL's in magnetic disk readers. This permits the system to rapidly lock in as it shifts back and forth between single density header and double density data fields; the low gain is lower than normal for disk tracking loops, to provide increased lock-in range and decreased sensitivity to bit shift. The latter characteristic is particularly necessitated by the close spacing of bits (and consequently high bit shift) in double density recordings.

The data separator 36 is shown in block diagram form in FIG. 4. As above stated, it is the function of the data separator to "demultiplex" the interleaved information bit and synchronization bit streams. For this purpose, a data window is generated by data window generator 202. The data window generator receives as its input the CLK signal from the PLL and an initialization signal from data separation control unit 205, on line 204, to control the phase of the data window. The DATA WINDOW signal provided at the output of the data window generator on line 206 is formulated to be high during the times information (i.e., data) bits are expected and low for the times when synchronization bits are expected. Synchronization of the data window with the synchronization bit stream is accomplished by exploiting the fat that during a preamble any "1" received must represent a synchronization bit. If during the preamble a "1" is received when the data window is present (i.e., the DATA WINDOW signal is high), the "1" is automatically treated as a synchronization bit. Since this means the data window is out of phase with the data bit stream, data separation control unit 205 provides a window initializing signal on line 204, to shift the DATA WINDOW signal 180°, and place it in proper phase.

The DATA WINDOW signal and the DG signal from the data gate are both provided to data bit separator 208 and sync bit separator 212. The data bit separator "looks" for data bits when the DATA WINDOW signal is high, while the sync bit separator looks for sync bits when the DATA WINDOW signal is low. The DATA WINDOW signal is also provided to a read strobe pulse generator 213, along with the VCO output signal on lead 176. The read strobe pulse generator provides a relatively narrow (i.e., several hundred nano-second) pulse when the DATA WINDOW signal goes high, synchronously with the leading edge thereof. This pulse is used to indicate to a control unit (not shown) to which the data is supplied that a data bit may be read at such time.

The outputs of the data bit separator 208 and the sync bit separator 212 are provided to a pair of synchronizers 214 and 216, respectively. The synchronizer 214 presents a separated data bit at its output in synchronism with the leading edge of a trigger pulse provided on line 222. The waveform on line 222 comprises the CLK signal nanded with the $\overline{\text{DATA WINDOW}}$ signal. Hence, a detected data bit appears at the output of synchronizer 214 on the leading edge of the next subsequent bit in the CLK signal. Conversely, the trigger on line 224 for the synchronizer 216 comprises the CLK signal nanded with the DATA WINDOW signal. Thus, a detected sync bit appears at the output of synchronizer 216 also on the leading edge of the next subsequent sync bit, but when the DATA WINDOW signal is high, instead of when it is low. This synchronizing operation is performed to eliminate certain timing inaccuracy and jitter which might otherwise result. The separated and synchronized data and sync bits are then supplied to data/sync register and logic unit 217 which implements a decoding algorithm for decoding the single or double density data in the data field. This algorithm is set forth in detail in my aforementioned copending U.S. Patent Application entitled "technique for Recording Data on Magnetic Disks at Plural Densities," filed on even date herewith, incorporated by reference for its disclosure of the encoding and decoding scheme for single and double density data fields.

In addition to providing an initialization signal for the data window generator, data separation control unit 205 also controls the read strobe pulse generator 213 as well as the data/sync register and logic unit 217. The read strobe initializer portion 205c of the data separation control unit provides a signal to read strobe pulse generator 213 to prevent the generation of read strobe pulses when the FAST LOCK signal is high. Another part of the data separation control unit, the density select synchronizer and controller 205b generates the MFM signal in response to the RD 2F signal provided by the user through the system controller. The MFM signal is supplied to the PLL divide-by-N counter 114 and, on line 219, to the data/sync register and logic unit 217. Basically, when the RD 2F signal is low, the user (i.e., programmer) is indicating that the data field should be read as a single density recording. Thus, the MFM signal should also be low. The converse is true for a high RD 2F signal, of course. The density select synchronizer and controller ensures that the MFM signal is high, if at all, only for the data field.

Having thus described the system in block diagram form, reference is now made to an exemplary detailed embodiment of the invention. FIG. 5 shows a detailed logic diagram for the preamble detector 34. The pream- ble detector proper receives an input signal DG from data gate 28 at the "front end" of the preamble detector. Depending on the binary state of the MAINT MODE signal provided on line 42 from the system controller (not shown), data gate 28 provides as its output signal (at pin 8 of NAND gate E373), on line 32, either the RD DATA signal on line 24 or the WT DATA signal on line 38. The former is provided when the MAINT MODE signal is low, while the latter is provided when the MAINT MODE signal is high. As stated above, the MAINT MODE signal is a control signal which permits the system to operate on either the digitized read signal output from the read chain or on a special test sequence signal, WT DATA. This allows the functioning of the preamble detector, phase lock loop and data separator to be evaluated in response to a signal pattern of known properties.

The output signal DG from data gate 28 is supplied to the preamble detector 34 at four locations: One input of NAND gate E390, the clock terminal of data detector flip-flop E400, one input of NAND gate E380 and the clock input of flip-flop E401. NAND gate E390 also receives, as another input, a signal called LOCK CLK provided by the system control unit (not shown). The LOCK CLK signal controls the operation of the phase error detector, PLL and data separator. When high, it activates the phase error detector and, in turn, the PLL and data separator. When low, it causes the phase error detector to reset, thereby inhibiting the PLL and data separator. When the LOCK CLK signal is high, the output of gate E390, on pin 8 thereof, is the inverse of the DG signal provided on input pin 10 of gate E390. The output of gate E390 is connected to the load (LD) terminal of the counter E35 which comprises the preamble window generator 48. Counter E35 may, for example, be a type 74LS193 integrated circuit 4 bit up/down counter. A low applied to the load terminal of counter E35 causes it to "reset"—i.e., transfer the count at the input terminals D0-D3 to the corresponding output terminals R0-R3. Thus, the preamble window generator is reset by DG when LOCK CLK is high; when LOCK CLK goes low, the output (i.e., pin 8) of E390 remains high, without regard to the state of the DG signal.

Start/stop oscillator 52 comprises a conventional recirculating delay line oscillator having a NAND gate E391, a buffer E340, a delay line E33, and a resistor R22. An inverter E520 is also provided for obtaining an output signal having the desired phase. A state transition provided to the oscillator on pin 12 of NAND gate E391 will, if pin 12 of E391 is high, appear in inverted form at output pin 11 of gate E391. After a slight delay provided by delay line E33, the inverted transition will appear at pin 13 of gate E391, having circulated through buffer E34 and delay line E33. If pin 12 of NAND gate E390 is still high, the output of the gate will again change state (to the original state). This state charge produces a transition which also propagates through buffer E340 and delay line E33 until it appears at pin 13 of gate E391. This series of events may repeat several times, until the signal at pin 12 of NAND gate E391 goes low, thereby providing a square wave oscillation at the output of NAND gate E391. The input of inverter E520, (i.e., pin 13), is connected to a suitable point in the oscillator feedback path, such as the output of gate E391, to provide an oscillator output signal on line 54, having the proper phase for clocking the counter E35. Of course, once the signal on pin 12 of gate E391 goes low, the oscillator 52 stops.

The start/stop oscillator output from pin 12 inverter E520 is provided to preamble window generator 48. Start/stop oscillator 52 runs at a high frequency such as, for example, about 5 MHz. A signal of this frequency has a period of 200 nsec. The propagation delay provided by delay line E33 need be only half this amount, however, since each cycle of the square wave involves two successive delay intervals. Since the start/stop oscillator frequency is considerably higher than the data frequency, the preamble window generator employs a modulo fifteen counter E35 to provide a window signal on output line 56 having a duration which is a multiple of (i.e., fifteen times) the period of the start/stop oscillator signal. When the load input of the counter, pin 11, is low, the counter becomes loaded with the binary number pattern 0101. The counter then indexes (i.e., counts up) each time it receives a pulse on the count up (CUP) input, pin 5. On the eleventh count thereafter, the counter overflows and a carry bit (CRY) appears at pin 12; the carry output is normally high and goes low on the appearance of a carry bit. This applies a low signal to input pin 12 of NAND gate E391, and stops the oscillator 52 until a reset signal appears on the load input of the counter E35 from NAND gate E390. The carry output also provides a preamble bit window signal on line 56. The preamble bit window signal is provided to the D input of flip-flop E400, pin 12. The DG signal is also provided to flip-flop E400 at the clock input, pin 11. Thus, the falling (i.e., high-to-low) edge of the DG signal causes the signal on line 56 to be "dumped" to the output of flip-flop E400, appearing at the $\overline{Q}$ output terminal thereof, in inverted state. Thus, flip flop E400 essentially corresponds to the data detector 58 of FIG. 2. The $\overline{Q}$ output signal from flip-flop E400 is provided via line 62 to one input of OR gate 64. OR gate 64 also receives as an input, via line 68, the $\overline{\text{FAST LOCK}}$ signal supplied by the fourth byte counter. The output of OR gate 64 is connected to one input of AND gate E380, which receives as its second input the LOCK CLK signal. The output of AND gate E380 is connected to the load inputs (pin 11) of both the first byte counter E32 and the fourth byte counter E31, as well as to the clear input (pin 1) of D-type flip-flop E401. Since the only non-zero (i.e., high) bits present during a valid preamble are synchronizing bits, the window signal on line 56 should be in a low state whenever flip-flop E400 is clocked. If, however, an information bit is present, it, too, will clock data detector flip-flop E400; however, the window signal on line 56 should be high during information bit intervals, causing the non-asserting flip-flop output (Q) to provide a low signal on line 62. This, in turn, will cause the output of OR gate 64 to go low (since the FAST LOCK signal on line 68 should be low during the preamble), driving the output of AND gate E380 low. A low signal therefore appears at the load inputs of counters E31 and E32 and the clear input of flip-flop 304. The low signal on the load inputs of first and fourth byte counters E32 and E31 (i.e., pin 11, assuming an exemplary type 74LS193 counter for both) causes their outputs R0-R3 to be loaded with the bit values on their inputs D0-D3, namely, all zeros. Thus, if a high data bit is sensed while the preamble detector is operating, the preamble detector is automatically reset to a count of zero for the byte counter. Since a low signal on either input of AND gate E380 will have the same effect, the byte counter will also be reset if and when the LOCK CLK signal goes low.

With the load input terminal released (i.e., high), each high to low transition on the count up input, pin 5, causes counter E32 to increment by a count of one. The signal applied to the count up input to control the first byte counter E32 is the logical AND of the DG signal and the FAST LOCK signal, supplied by the output of the AND gate E381. Thus, with the FAST LOCK signal high, as it should be during the first byte of the preamble, the output of first byte counter E32 increments with each successive synchronization bit in the DG signal. The eighth bit of the first byte of the preamble causes a high level to appear at the $2^3$ (i.e., R3) output of counter E32, pin 7. This output is applied to one input of OR gate E361. The output of OR gate E361 is connected to the D input of flip-flop E401. The Q output of flip-flop E401 is connected back to the second input of OR gate E361. It will thus be realized that the function of flip-flop E401 is to latch upon the detection of the first byte of 0's in the preamble. Consequently, flip-flop E401 provides the INHIBIT signal. By definition of signal polarity, the Q output of flip-flop 304 originates the INHIBIT signal, while the $\bar{Q}$ output generates the $\overline{\text{INHIBIT}}$ signal.

The 16th consecutive low bit (i.e., the last bit of the second full byte of the preamble) causes the carry output of first byte counter E32 to go high. This carry output is connected to the input of an inverter E261. The output of inverter E261 is, in turn, connected to the count up input (cup) of fourth byte counter E31. Thus, the high-to-low change of state at the carry output of the first byte counter E32 (on the 16th bit) causes a low-to-high transition to be applied to the count up input of fourth byte counter E31, this causing the fourth byte counter to index by a count of 1 from an initial count of 0. The carry output remains low only a short time and then goes back to a high state. Sixteen bits later (i.e., at the end of the fourth byte of the preamble), assuming there have been no intervening "1's" detected, the carry output of the first byte counter will again go low, causing the fourth byte counter to index once more. This will cause the $2^1$ output, R1, of the fourth byte counter to go high, signalling the detection of four successive bytes of 0's—that is, a valid preamble. The FAST LOCK signal is derived from the R1 output of counter E31 through inverter E263 and its inverse is provided directly by the R1 output. Thus, the FAST LOCK signal is high initially during the search for a preamble and goes low at the end of the fourth byte of 0's, at which time the preamble is confirmed. When the FAST LOCK signal does low, it brings the output of AND gate E381 low, effectively disconnecting the DG signal therefrom and preventing any further indexing of first byte counter E32. Since the $\overline{\text{FAST LOCK}}$ signal is applied to one input of OR gate 64, the output of OR gate 64 becomes high at the end of the fourth byte in the preamble. Because the output of OR gate 64 is one of the inputs of AND gate E38, the output of AND gate E380 will then be the same as the LOCK CLK signal at its other input. When the LOCK CLK signal then goes low, so does the AND gate output. This, in turn, resets (i.e., clears) counters E32 and E31 and flip-flop E401.

Figure 6A:
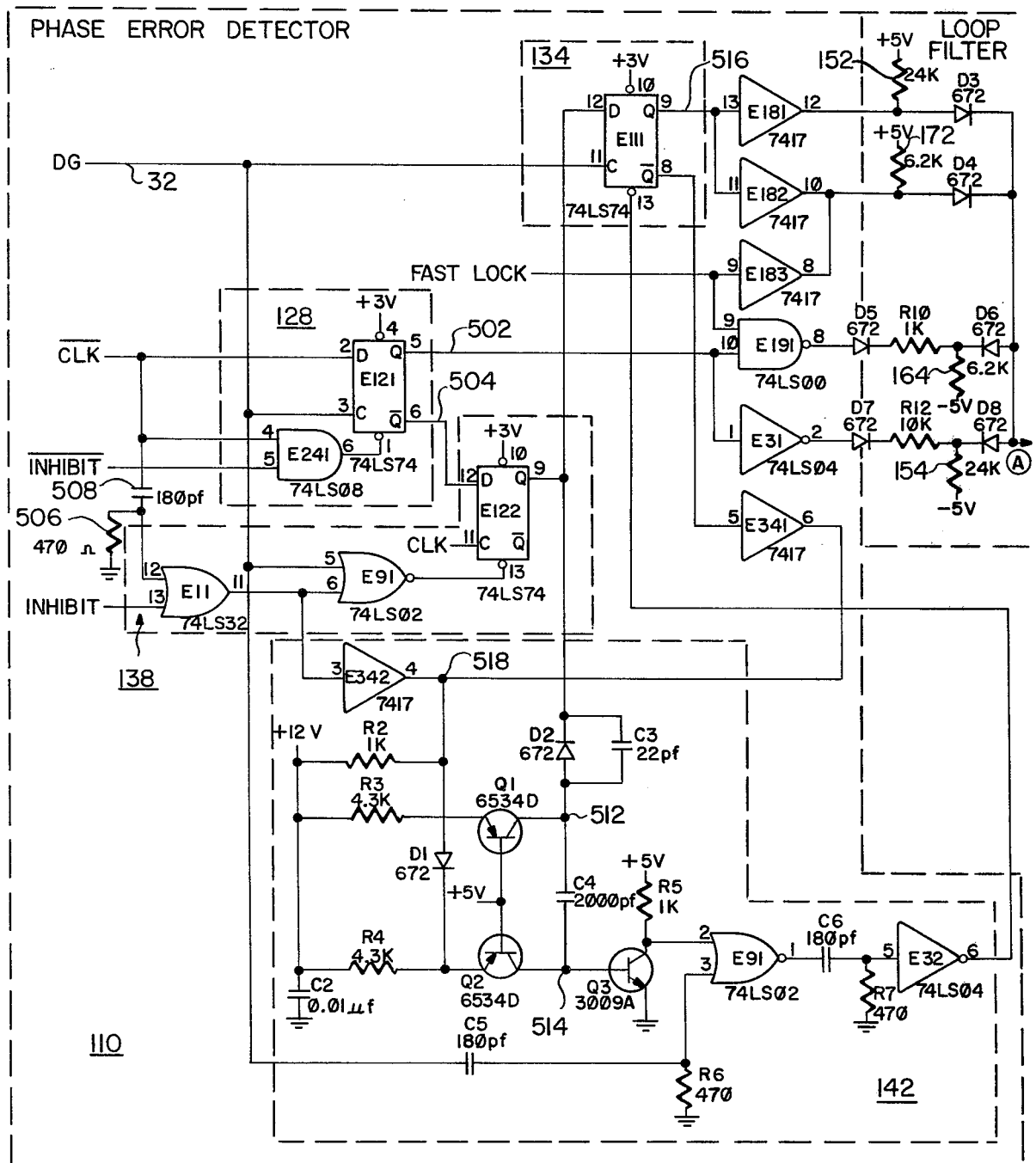
FIG. 6A and 6B together are a schematic circuit diagram of the phase locked loop of FIG. 3.
Figure 6B:
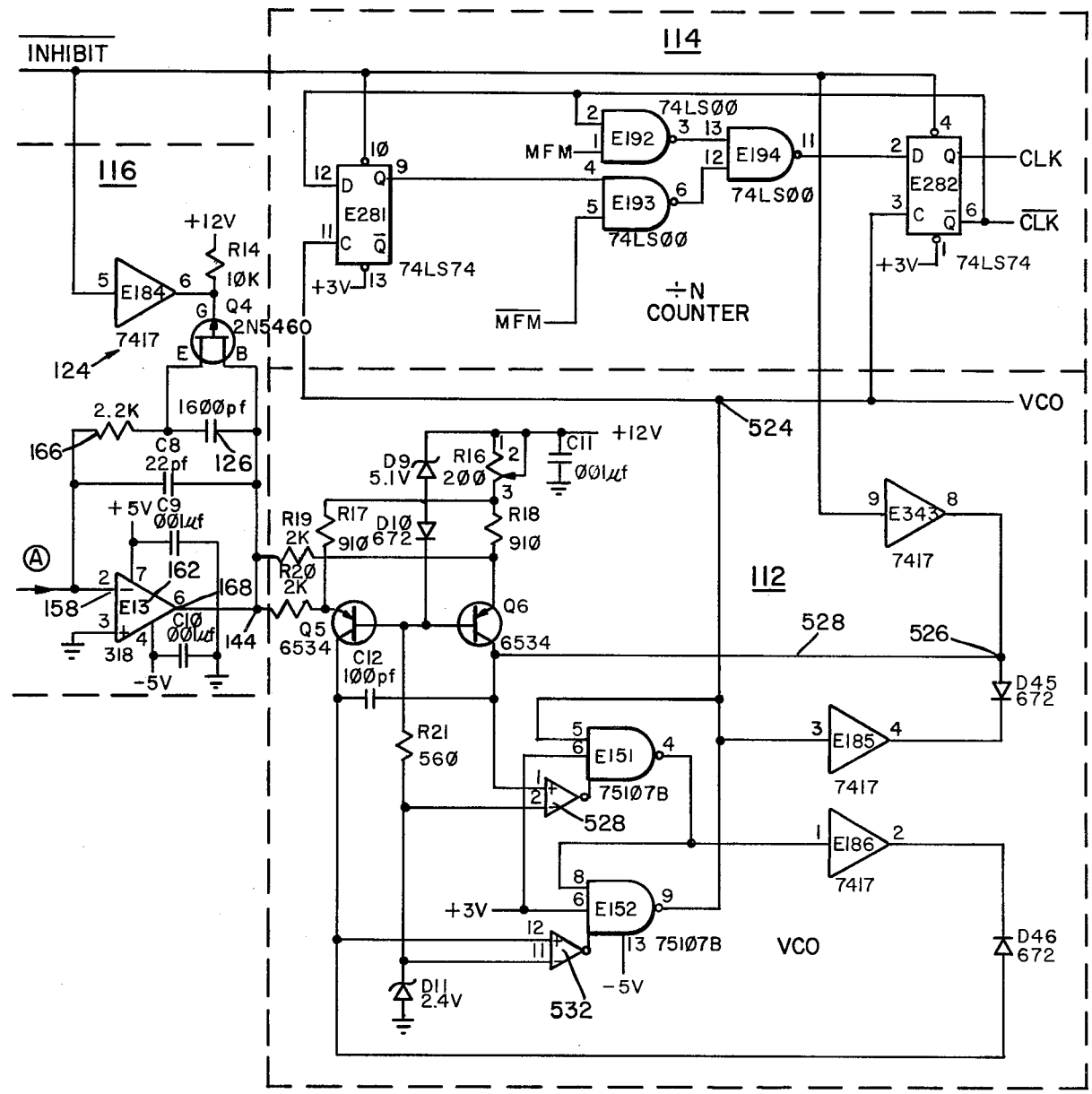

A detailed circuit diagram of a suitable phase locked loop for the magnetic disk reader of the present invention is shown in FIGS. 6A and 6B which will be jointly explained below. It should be understood that the circuitry shown in FIG. 6A is connected to the circuitry shown in FIG. 6B at the point labeled A in both of those figures.

The phase error detector, or phase comparator 110, measures the amount of phase (time) lead or lag between each synchronization bit in the DG signal and the corresponding internally generated clock bit of the CLK signal which is derived from the VCO output. The phase error detector operation will be explained by first considering what happens when a synchronization bit is received earlier than the corresponding, internally generated clock bit. This situation is sensed by early data detector 128. Assume initially that the INHIBIT signal is high, as during the first byte of a preamble. When the INHIBIT signal goes low, the $\overline{\text{INHIBIT}}$ signal goes high and the $\overline{\text{CLK}}$ signal is gated through to the output of AND gate E241 which, in turn, is connected to the clear input terminal of flip-flop E121. Thus, the first CLK bit after the change of state of the INHIBIT signal clears the flip-flop E121. Next, a synchronization bit appears in the DG signal on line 32 which is connected to the clock input of flip-flop E121. Since it has been postulated that this synchronization signal leads the corresponding bit in the CLK signal, the $\overline{\text{CLK}}$ signal connected to the D input of flip-flop E121 should be high when the flip-flop is clocked by that synchronization bit. A high signal is, therefore, provided the Q output of flip-flop E121. The Q output remains high until the $\overline{\text{CLK}}$ signal goes low (i.e., the clock bit supplied by the VCO arrives), forcing the output of AND gate E241 low, clearing flip-flop E121. Thus, the Q output of the early data detector flip-flop E121 is high for a period of time equal to the time delay between the synchronization bit of the DG signal and the corresponding clock bit provided by the VCO. An oppositely phased signal is provided by the $\bar{Q}$ output of the same flip-flop, on line 504, for use by the late data anticipator, as explained below.

The Q output of flip-flop E121 is provided on line 502 to one input of AND gate E191 and to the input of inverter E31. If the FAST LOCK signal is high, the output of NAND gate E191 goes low when the signal on line 502 is high. At the same time, diode D5 is turned off and diode D6 is turned on, by connecting the inverting input 158 of operational amplifier 162 to a −5 volt source through diode D6 and resistor 154. Similarly, the low signal appearing at the output of inverter E31 turns of diode D7 and turns on diode D8, connecting inverting input 158 to the −5 volt source through diode D8 and resistor 154. Under these circumstances resistors 154 and 164 effectively appear in parallel. If, however, the FAST LOCK signal is low, the output of NAND gate E191 is high, turning on diode D5 and turning off diode D6 so that resistor 164 is disconnected from amplifier 162.

Late data anticipator 138 is comprised of OR gate E11, NOR gate E91 and D-type flip-flop E122. One input of OR gate E11, pin 13, receives the INHIBIT signal. The other input of OR gate E11 is connected to the common ground through resistor 506 and to one terminal of a capacitor 508. The other terminal of capacitor 508 is connected to the CLK signal source 20. Capacitor 508 and resistor 506 comprise a basic differentiator network and introduce a slight delay with respect to the propagation of pulse edges. The output of OR gate E11 is connected to one input of NOR gate E91. The other input of NOR gate E91 is connected to line 32 which carries the DG signal. The output of NOR gate E91 is connected to the clear terminal of flip-flop E122. The D input of flip-flop E122 is connected to line 504 and receives the $\overline{Q}$ output signal of flip-flop E121. The CLK signal is used to clock flip-flop E122. Initially, if the INHIBIT signal is high, the output of OR gate E11 is high and the output of NOR gate E91 is low, clearing flip-flop E122. When the INHIBIT signal goes low the signal on the clear input to flip-flop E122 goes high until a bit appears in the DG signal or a high signal appears at input pin 12 of OR gate E11. The latter happens just slightly after the rising (i.e., trailing) bit in the CLK signal. The $\overline{CLK}$ signal also clears flip-flop E121 through AND gate E241, providing a high signal on line 504. On the falling edge of the CLK signal, flip-flop E122 is clocked and a high signal consequently appears at its Q output. The signal thus provided at the Q output of flip-flop E122 comprises an indication that the data bit is not early and that it should be anticipated that the data bit will be late. Therefore, the signal at the Q output of flip-flop E122 is termed the ANTICIPATE DATA LATE signal. The ANTICIPATE DATA LATE signal is provided to the D input of late data detector flip-flop E111 and to the cathode of diode D2.

When the ANTICIPATE DATA LATE signal is high, diode D2 is reversed bias to turn it off. This permits delay one shot multivibrator 142 to turn on. The delay one shot multivibrator develops a pulse equal in length to the time by which the data bit is late. When and if the data bit arrives, it clocks the flip-flop E111 of the late data detector 134, to "dump" the high level on the D input thereof to the Q output. The data bit also clears flip-flop E122 through NOR gate E91, driving the ANTICIPATE DATA LATE signal low. Flip-flop E111 is cleared by the delay one shot multivibrator 142 at a point in time which is equally as late with respect to the late data bit as the late data bit was with respect to the clock bit.

More particularly, when the ANTICIPATE DATA LATE signal goes high, opening diode D2, capacitor C4 is charged from the +12 volt source through transistor Q1 and resistor R3, at a constant rate. Thus, at any point in time after diode D2 opens the charge on capacitor C4 will be proportional to the time it has been charging. When a late data bit finally arrives, the ANTICIPATE DATA LATE signal goes low and diode D2 becomes forward biased. The voltage at node 512 (at the juncture of the anode of diode D2, the collector of transistor Q1 and the first terminal of capacitor C4) abruptly drops to a very low potential. Correspondingly, the continuity of voltage across capacitor C4 causes a like change in voltage to occur at node 514 (at the juncture of the second terminal of capacitor C4 and the collectors of transistors Q2 and Q3). This produces a negative voltage at node 514 and thereby reverse biases the base-emitter junction of transistor Q3, to turn it off. Capacitor C4 then proceeds to discharge through transistor Q2 and resistor R4. Because the same potential is maintained acoos resistors R3 and R4 and they have the same value, the discharge current through transistor Q2 is maintained at the same value as the charging current which had been supplied by Q1, so that it takes the same amount of time for capacitor C4 to discharge as it did to charge, i.e., the time corresponding to the phase error of the late data bit. When capacitor C4 is discharged, transistor Q3 again turns on and rapidly saturates, producing a low signal on the collector of transistor Q3 and on input pin 2 of NOR gate E91 which is connected thereto. The second input terminal, pin 3, of NOR gate E91 is normally tied low through resistor R6, thus causing the output of NOR gate E91 to switch from low to high. This transition is applied to the input of inverter E32 through the couplngdifferentiatoraping network comprised of capacitor C6 and resistor R7. The output of inverter E32 then switches to a low state and, since it is connected to the clear input of flip-flop E111, clears that flip-flop and terminates the late data pulse provided on line 516.

It should also be noted that the DG signal which is connected to input pin 3 of NOR gate E91 through the coupling-differentiator network comprised of capacitor C5 and resistor R6 will also, similarly, cause flip-flop E111 to be cleared when transistor Q3 is cut off.

When a data bit is missing entirely, additional means are provided to discharge capacitor C4 at a more rapid than normal rate. Under these circumstances, the signal at the $\overline{Q}$ output of flip-flop E111 will be low, as will the input of buffer E341 to which it is connected. However, node 518 (at the junction of the outputs of buffers E341, and E342, resistor R2 and the anode of diode D1) will be at a low level because the input of buffer E342 will be low. Thus, diode D1 will be reversed biased. However, when the $\overline{CLK}$ signal goes high, the output of OR gate E11 very briefly go high, pulling the input of buffer E342 high and allowing node 518 to also go to a high voltage level. This permits diode D1 to become forward biased and additional discharge current is supplied to capacitor C4 through resistor R2, diode D1 and transistor Q2, to reduce the time required by capacitor C4 to discharge.

When the late data signal on line 516 is high, the input of buffer E181 is high and this produces a high output for that buffer. Diode D3 is thereby forward biased and the inverting input 158 of the amplifier 162 is connected to a +5 volt source through resistor 152. The signal on line 516 is also supplied to the input of buffer E182. However, the output of buffer E182 may be high only if the output of buffer E183 is also high. The condition of buffer E183 is, in turn, controlled by the FAST LOCK signal supplied to the input thereto. If the FAST LOCK signal is high, the output of buffer E183 is high and, in turn, diode D4 will be forward biased, so that the inverting input 158 of the amplifier 162 is also connected to the +5 volt source through resistor 172. However, if the FAST LOCK signal is low, the output of buffer E183 is low and diode D4 is reversed biased so that resistor 172 is disconnected from the inverting input of the amplifier 162.

Thus, a pulse-width modulated signal appears at point A, the inverting input 158 of the phase locked loop low-pass filter amplifier 162. The duration of the pulses thereat correspond to the amount of phase error between corresponding bits of the CLK signal provided by the PLL divide-by-N counter 114 and the synchronization bits in the DG signal on line 32. The polarity of the pulses is determined by the direction of the phase error. As explained above, early data produces negative pulses while late data produces positive pulses. The phase locked loop filter 116 is basically an active, low-pass filter comprised of operational amplifier 162, capacitors 126 and C8, resistor 166 and whichever of resistors 152, 154, 164 and 172 are connected to point A through diodes D3, D8, D6 and D4, respectively. The output of loop filter 116 at node 522 (connected to VCO input terminal 144) comprises an analog signal representing the time-average value of the pulse waveform supplied by the phase error detector, multiplied by the gain of the amplifier, with the interval of the time-average restricted to a period of time determined by the response of the amplifier.

It is noted that the PLL and, particularly, the low-pass filter 116 are designed to accommodate a very wide range of operating parameters. Specifically, they will accommodate bit shift of at least 15% at flux reversal densities of greater than 6500 FCI and disk playback frequency variations of up to about 6%. With reference to the latter condition, it is noted that the 6% figure pertains to speed variations occurring principally in connection with the interchange of disks. The sinusoidal frequency of the signal at the read head(s) nominally ranges from about 125 kHz to about 250 kHz; correspondingly, the frequency of the digitized signal at the read chain output varies from 250 kHz to 500 kHz, for both single and double density encoding. The dynamic response of the PLL which permits tracking throughout is essentially provided by and controlled in the loop filter and to a lesser extent in the VCO.

The outstanding feature in this PLL design is that it permits fast synchronization (i.e., acquisition). The PLL is allowed three bytes out of a six byte preamble preceding a header or data field to gain phase lock. Thus, there are only 24 actual bits available for the acquisition of phase lock, since the only bits in the preamble are clock bits. The DC gain of the low-pass filter is raised during this three byte acquisition period, so that phase lock can be guaranteed over the entire range ±6% of frequency variation. Further the design shown in the figures provides a capture range which extends from 10% below to 10% above the nominal digitized playback frequency when the low-gain mode is employed. And acquisition of phase lock in less than 34 microseconds is assured, over the entire capture range. Within this acquisition time, the phase error is reduced to less than 6% of the initial phase error.

It is additionally noted that the phase locked loop of the present invention maintains phase lock in data fields where bit shifts are up to about 32% in the case of single density data field and up to 15% in the case of double density data fields. The difference in the bit shift which may be a accommodated at the two density rates is due to the fact that in decoding double density data fields, the clock output signal derived from the VCO has to run at twice the data frequency; this reduces the tolerable bit shift to one-half that which is permissible in the case of single density data fields. Disk acceleration errors of up to about 2% over a time period of approximately 50 microseconds are also accommodated.

Capacitor C8 is provided only for stabilization of amplifier 162 which may, for example, be a type LM 318 operational amplifier. Thus, the feedback path around the amplifier 162 is basically from its output terminal 168 to its inverting input terminal 158 through capacitor 126 in series with resistor 166. Capacitor C8 is connected in parallel with the series combination of capacitor 126 and resistor 156. Further, as explained above, a switch 124 is connected across capacitor 126 for initializing the loop filter to provide a start-up condition indicating phase error. The switch 124 is comprised of a field effect transistor Q4, a buffer E184 and a resistor R14. The drain and source electrodes of the field effect transistor are connected to the respective terminals of capacitor 126 and the gate electrode is driven by the output of the buffer 184 which is connected to a +12 volt source through resistor R14. The input terminal of the buffer E184 is connected to the source of the INHIBIT signal. Thus, when the INHIBIT signal is high, capacitor 126 is discharged through the source-drain path of the field effect transistor Q4. When the INHIBIT signal is low, Q4 basically presents a very high resistance approximating an open circuit across capacitor 126.

The VCO 112 is of a conventional design, and, as such does not require detailed explanation. A complete circuit schematic diagram is provided in FIG. 6B and the operation of the VCO should be apparent therefrom. The VCO input (i.e., frequency control voltage) appears at node 522 connected to terminal 144 and the output signal, also labeled VCO is provided at the node 524. For controlling the running of the VCO, the $\overline{\text{INHIBIT}}$ signal is provided to the input of buffer E343, with the output of buffer E343 being connected to node 526. With the $\overline{\text{INHIBIT}}$ signal high or, correspondingly, the INHIBIT signal low, the output of buffer E343 is low, pulling the voltage at node 526 low and sinking the current from current source Q6 through lead 528. This prevents capacitor C12 from charging, thereby preventing the VCO from oscillating. When the INHIBIT signal is low, on the other and, the output of buffer E343 is high and permits the VCO to function.

The divide-by-N counter 114 provides a signal at either one-half or one-fourth the frequency of the VCO signal, in phase therewith. Since the preset inputs of D-type flip-flops E281 and E282 are both connected to the $\overline{\text{INHIBIT}}$ signal, the divide-by-N counter will start operating (i.e., responding to the VCO signal supplied to the clock inputs of flip-flops E281 and E282) with the Q outputs of both of those flip-flops in the high state. The $\overline{Q}$ output of flip-flop E282 which supplies the $\overline{\text{CLK}}$ signal is, however, connected to the D input of flip-flop E281. Thus, the signal on the D input of flip-flop E281 is initially a binary 0. If a single density field is to be read, the $\overline{\text{MFM}}$ signal will be high and the MFM signal will be low. Thus, the output of NAND gate E192 will be high and the output of NAND gate E193 will be the inverse of the signal at the Q output of flip-flop E281. One input of NAND gate E194 is connected to the output of NAND gate E192 and the other input of NAND gate E194 is connected to the output of NAND gate E193; the output of NAND gate E194 is connected to the D input of flip-flop E282. Thus, for reading single density data fields, the Q output of E281 is "connected" to the D input of flip-flop E282, providing a conventional divide-by-four counter clocked by the VCO signal and providing as its outputs the CLK and $\overline{\text{CLK}}$ signals at the Q and Q outputs, respectively, of flip-flop E282. If, however, the MFM signal is high, indicating that a double density data field is to be read, the output of NAND gate E193 is high and the output of NAND gate E192 is the CLK signal, so that the D input of flip-fop E282 is effectively connected to the $\overline{Q}$ output thereof. Thus, flip-flop E282 will toggle (i.e., change state) once every two clock (i.e., VCO) pulses, thereby providing a conventional divide-by-two counter.

From this discussion, it is to be realized that the PLL shown here is a so-called "type 2" servo system utilizing a sampling phase comparator (i.e., phase error detector) with the complete phase error range of −180° to +180°. Phase error is sampled on a bit-wise basis at the input data rate, be it the single density rate or the double density rate. By disabling the VCO prior to the sampling of the first input data pulse during the intitial phase lock acquisition period, the phase error is equal to the difference between the nominal VCO frequency and the frequency of the data input. Further, the system does not cycle skip during the initial phase lock acquisition period because the high low-pass loop filter gain and initial phase error of less than 90° make it impossible to accumulate a 180° phase error before phase lock is achieved.

Figure 7A:
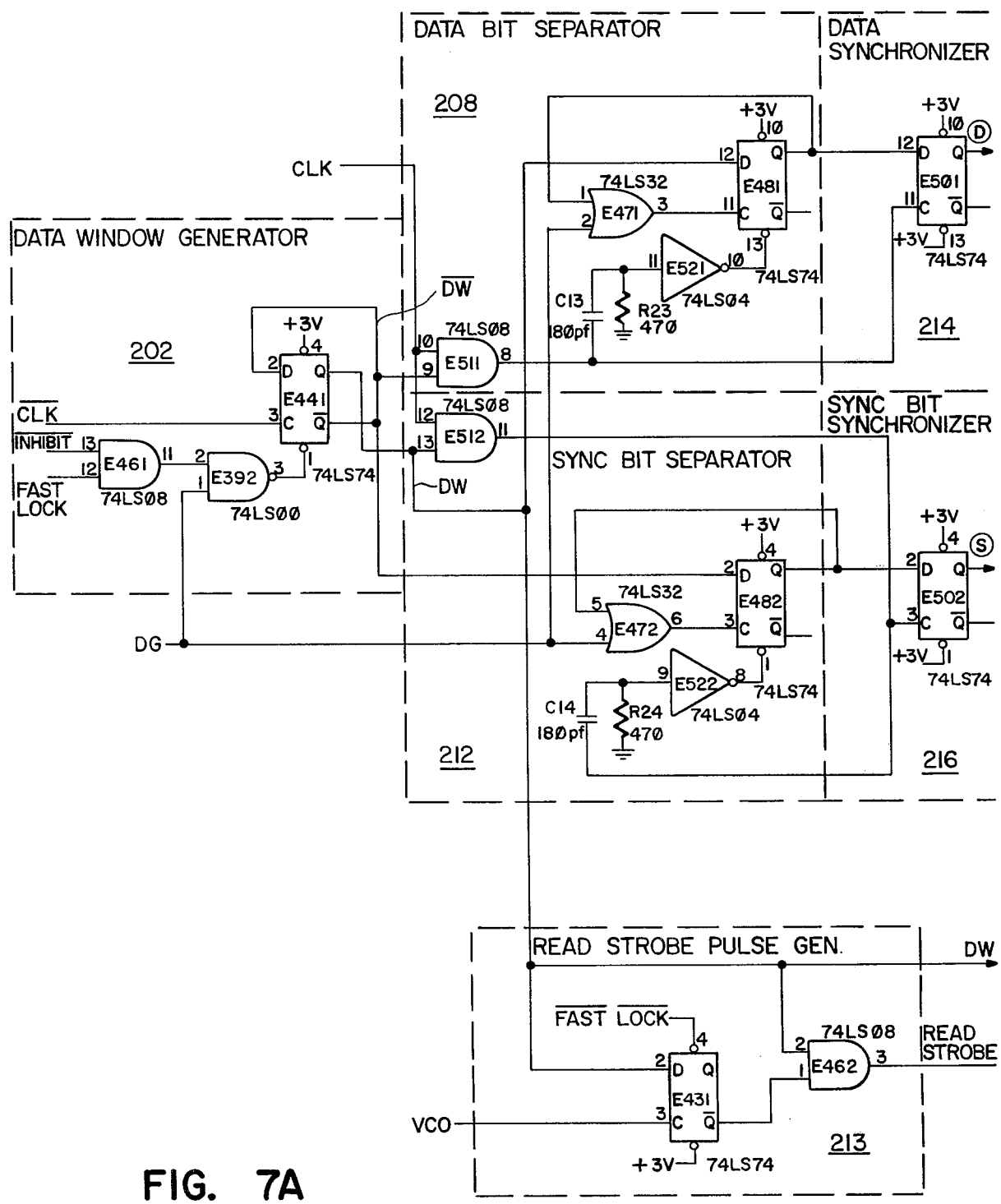
FIGS. 7A and 7B together are a schematic circuit diagram of the data separator of FIG. 4.
Figure 7B:
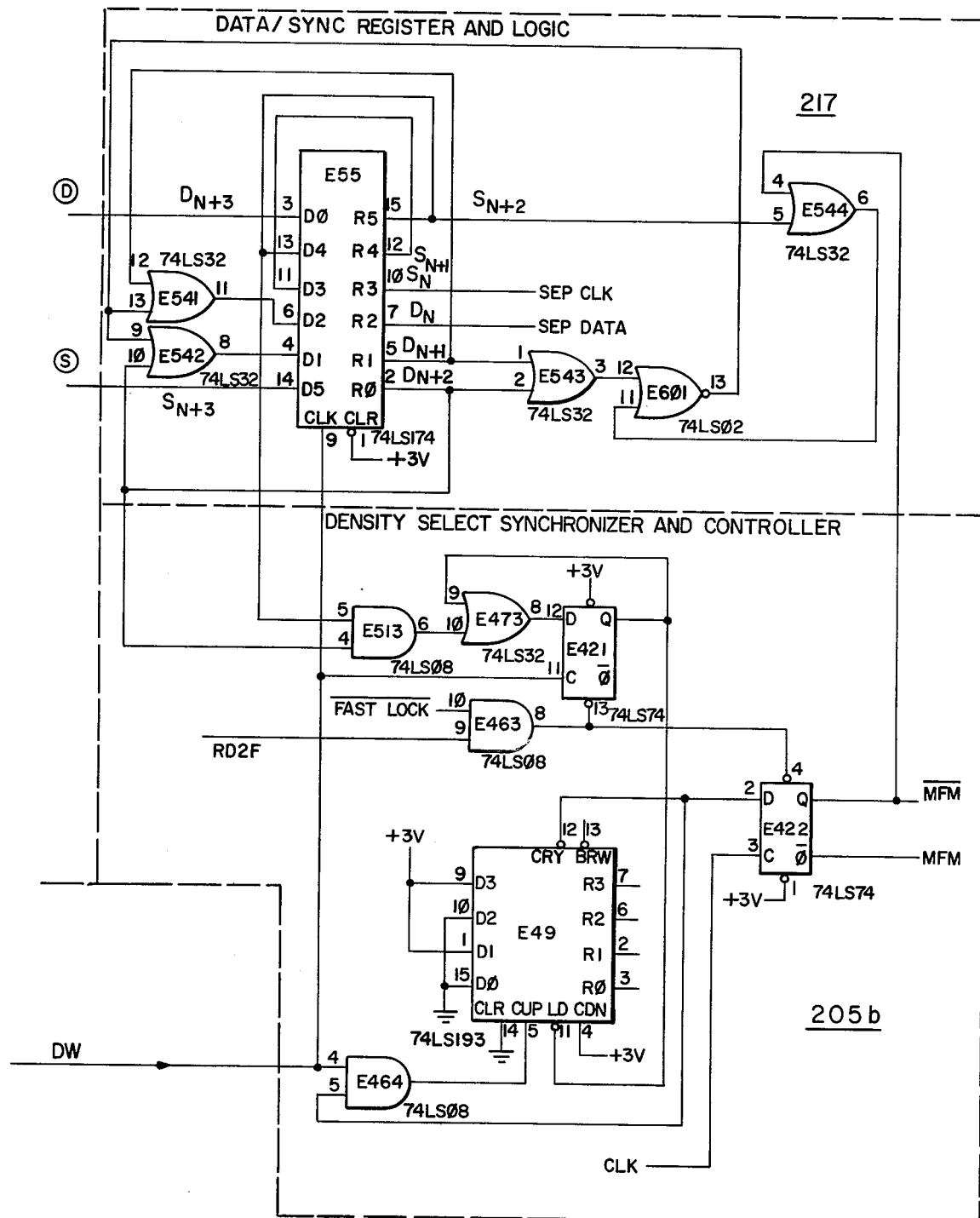

A detailed circuit diagram of the data separator as shown in FIGS. 7A and 7B which will be explained jointly below. It is generally noted that with the exception of density select synchronizer and controller 205b, the functional sub-components of the data separation control unit 205 are distributed throughout the circuitry and do not appear as separately definable blocks.

Data window generator 202 is comprised of AND gate E461, NAND gate E392 and D-type flip-flop E441. AND gate E461 receives as a first input the $\overline{\text{INHIBIT}}$ signal and as a second input the FAST LOCK signal. Thus, the output of AND gate E461 (or, and the input of NAND gate E392 to which it is connected) is high during the preamble, when the phase locked loop is attempting to acquire lock. The DG signal is applied to the other input of NAND gate E392; thus its output is forced low when its other input is high and the DG signal becomes high. Since the output of NAND gate E392 is connected to the clear input of flip-flop E441, flip-flop E441 is repetitively cleared by the DG signal during the preamble. When the preamble is complete, the FAST LOCK signal becomes low and the output of NAND gate E392 is forced into a high state releasing the clear input of flip-flop E441. Thereafter, the Q output of flip-flop E441 starts in the 0 state and toggles with each succeeding rising edge of the CLK signal or, alternatively, each falling edge of the $\overline{\text{CLK}}$ signal. It should thus be realized that the function of gates E461 and E392 is to insure that the output of flip-flop E441 starts in the proper phase at the end of the preamble. For convenience, the data window signal provided at the Q output of flip-flop E441 shall be referred to as the DW signal. Naturally, the $\overline{\text{Q}}$ output of flip-flop E441 supplies the $\overline{\text{DW}}$ signal.

AND gate E511 of data bit separator 208 received the CLK signal and a first input thereto and the DW signal and a second input thereto. Thus, the clock bits appear at the output of gate E511 when the data window signal is not present. The output of gate E511 is connected to the clock input of flip-flop E501 in the data synchronizer 214 and to a first terminal of capacitor C13. The second terminal of capacitor C13 is connected to the input of inverter E521 and through resistor R23 to ground. The output of inverter E521 is connected to the clear input of flip-flop E481 so that a short, slightly delayed pulse is provided thereto on the leading edge of each clock bit gated through AND gate E511, to clear flip-flop E481 between data bits. The D input of flip-flop E481 is connected to Q output of flip-flop E441, to receive the DW signal. Flip-flop E481 is clocked by the output of OR gate E471 which receives as its inputs the Q output of flip-flop E481 and the DG signal. Since flip-flop E481 will have been cleared as already described, it is initially clocked by a data bit in the DG signal. Since the data window is present (i.e., the DW signal is high) only when data bits should be expected and not when synchronization bits should be present in the DG signal, the Q output should go high. The OR gate E471 holds the flip-flop E481 in this set condition so that it will not be reset or cleared before its state has been sampled by the data synchronizer 214.

Data synchronizer 214 merely comprises D-type flip-flop E501. Flip-flop E501 receives the Q output of flip-flop E481 of the data bit separator and provides a signal of the same state at its Q output on the next pulse in the CLK signal, thereby synchronizing the detected data bit with the CLK signal. In other words, the detection of a data bit is indicated by a high level at the Q output of flip-flop E481 and this is sampled and used to generate a synchronized separated data bit stream at the output of flip-flop E501, point D.

Sync bit separator 212 and sync bit synchronizer 216 are identical to data bit separator 208 and data synchronizer 214, with the exception that AND gate E512 receives as one input thereto the DW signal rather than its inverse. Thus, the sync bit separator "looks" for sync bits when the data window is absent i.e., the $\overline{\text{DW}}$ signal is high. And flip-flop E48 is cleared between successive synchronization its. The Q output of flip-flop E502 therefore provide a synchronized, separated sync bit stream.

Read strobe pulse generator 213 comprises a single D-type flip-flop E431 together with AND gate E462. Both the D input of the flip-flop and one input of the AND gate receive the DW signal. The other input of the AND gate E461 is connected to the $\overline{\text{Q}}$ output of flip-flop E431. The $\overline{\text{FAST LOCK}}$ signal is applied to the preset input of flip-flop E431 which is clocked by the VCO signal. With the FAST LOCK signal high, during the acquisition period in the preamble, the flip-flop E431 is preset so that a high signal is present at its Q output. When the FAST LOCK signal goes low, the preset is released. When the DW signal is low, the state of the flip-flop E431 changes on the next VCO signal pulse so that the signal at the $\overline{\text{Q}}$ output becomes high. The output of AND gate E462 is low, however, due to the DW signal. When the DW signal next becomes high, both inputs of AND gate E462 are high, simultaneously causing the output of that gate to become high, thus generating the READ STROBE signal. This condition lasts only briefly, however, since the next pulse in the VCO signal, brings the Q output of flip-flop E431 low, thereby causing the output of AND gate E462 to become low. Thus, the READ STROBE signal is high only for one period of the VCO signal, a few hundred nanoseconds.

The density select synchronizer and controller 205b generates the MFM and $\overline{\text{MFM}}$ signals for controlling the divide-by-N counter. Specifically, these signals are provided by D-type flip-flop E422. To understand the operation of the density select synchronizer, it should first be noted that the description of the sector format given above is incomplete in one respect. The preamble which proceeds a data field is not immediately contiguous to the data field itself. Rather, the two are separated by a data mark which comprises a single eight bit byte. Due to present industrial convention, it will be assumed that the data mark comprises the hexadecimal number FN (where N denotes an unspecified pattern of the four lower order bits) which, bit-wise, comprises a string of four 1's followed by an unspecified string of four bits. A different mark is used if the data field has been deleted. Since the data mark must be read at the single density rate, when the data field is encoded at the double density rate, the MFM signal must not go high until the end of the data mark. Consequently, it is the function of the density select synchronizer and controller to ensure that the MFM signal changes state, from low to high if at all, only at that time and not earlier. Otherwise, the data mark may not be properly read.

Various signals are indicated in the data/sync register and logic unit 217 indicative of the presence of a data mark byte. As explained above, the data mark byte will comprise both data bits and synchronizing bits which had been interleaved on the disk. The sequential data mark bits are referred to by the designation $D_X$, with the subscript X indicating the particular bit within the byte. The first bit in the data mark byte is given the consecutive subscript designation N and subsequent bits are given the subscript designations N+1, N+2, etc. Similarly, for the synchronization bits, the designation $S_X$ is used, with the same explanation for the subscript usage. Thus, it is intended that synchronization bit $S_X$ be associated with information bit $D_X$.

The data/synch register and logic unit 217 is shown in FIG. 7B in the condition of having already received the first two data mark (and corresponding synchronization) bits, with the third data mark bit then present at the input of register E55.

AND gate E463 of the density select synchronizer and controller receives the RD 2F signal on the first input thereto. The other input of AND gate E463 is supplied by the FAST LOCK signal. The output of AND gate E463 is connected to the clear input of flip flop E421 and to the preset input of flip flop E422. If the RD 2F signal is low, indicating that the data field is to be read at the single density rate, the output of AND gate E463 will be low, thus setting flip flop E422 and forcing the $\overline{\text{MFM}}$ signal high and the MFM signal low, as required.

The operation of the density select synchronizer and controller is a little more complicated when double density encoded data is to be read. In this case, the RD 2F signal is high during the preable so that when the $\overline{\text{FAST LOCK}}$ signal goes high at the end of the preamble, the output of AND gate E463 goes high, releasing the clear input of flip-flop E421 and the preset input of flip-flop E422, respectively. The data mark must now be detected and the length of the mark byte must be counted out so that the MFM signal will go high at the appropriate time. The data mark is detected by AND gate E513. Various signals are labelled in FIG. 7B to illustrate the decoding of the data mark byte. The first two bits of the data mark byte are basically ignored, to guard against false detection of a mark. Thus, AND gate E513 examines (i.e., receives as its input) the third data mark bit, $D_{N+2}$ and its associated synchronization bit $S_{N+2}$. These will simultaneously be high during their cell time if a data mark byte (i.e., hexadecimal FN) is detected. The output of AND gate E513 is connected to one input of OR gate E473 and, in turn, the output of OR gate E473 is connected to the D input of flip-flop E421. The other input of OR gate E473 is connected to the Q output of flip-flop E421. Thus, on the next falling edge of the window signal, DW, flip-flop E421 is clocked and the Q output thereof goes high and latches in that state until a low signal is applied to its clear input. Since this is the third bit of the mark byte, it is necessary to delay the presentation of the MFM signal for five more bit periods (i.e., cell times). That is the function of four bit counter E49. The load (LD) input of counter E49 is connected to the Q output of flip-flop E421. Hence, when the Q output of flip-flop E421 is low, the outputs R0–R3 of counter E49 are loaded with the initial count established at the D0–D3 inputs of the counter, a binary pattern of 1010, i.e., a decimal count of 10. When the Q output of flip-flop E421 goes high, the load input is disabled and counter E49 is permitted to respond to the signal at its count up (CUP) input. This signal is provided by the output of AND gate E464. The DW signal is provided to one input of AND gate E464 and the carry (CRY) output of counter E49 is connected to the other input thereof. Initially, the carry output of counter E49 is high, so that each of the next five window pulses in the DW signal cause the counter to increment by one. At a count of 15 (i.e. binary 1111), the carry output of counter E49 goes low, forcing the output of AND gate E464 low and effectively disabling the counter until it is either reloaded to the initial count of 10 or until the RD 2F signal goes low. The carry output of counter E49 is connected also to the D input of flip-flop E422. Flip flop E422 is clocked by the CLK signal. Hence, on the next pulse in the CLK signal, following the last data bit in the data mark byte, flip-flop E422 is clocked; its $\overline{Q}$ output then goes low and its Q output goes high, making the MFM signal high during the data field which follows. As described above, this will cause the data field to be read as encoded at the double density rate.

The data/sync register and logic unit 217 is not described in detail here since it is used only for the purpose for providing the signals required by AND gate E513 and for implementing the decoding algorithim necessary for decoding the double density information in the modified FM (or MFM) format. As indicated in the drawing, decoded and separated data bits appear in the SEP DATA while corresponding synchronization bits appear in the SEP CLK signal.

It is further to be understood that the above-described preferred embodiment is intended to be exemplary only, and not limiting. Various modifications, alterations and substitutions will readily occur to those familiar with the art. Thus it is intended that the scope of the invention be limited only as defined by the following claims and equivalents thereto.

What is claimed is:

1. In apparatus for reading data from a rotating magnetic disk whereon binary data has been recorded on a plurality of data fields, the data being recorded on each data field at a known density rate selected from among a set of substantially differing density rates, and wherein a control signal is provided to select the density rate for reading data from each field, the improvement comprising:

said control signal comprising, for each data field, a density-selection signal selected from among a plurality of available signals, each of which represents one of the available density rates of the set; and means responsive to the control signal for reading each data field at the density rate represented by the density-selection signal for that field, the density rate for reading each data field thereby being independent of the density rate for reading each other data field, whereby any combination of data fields on a disk record may be read in any arbitrary, desired order, in a single pass over the disk, regardless of the density rate variations from one data field to another.

2. The improvement of claim 1 wherein the means for reading includes a phase locked loop for synchronously detecting the recorded data, the phase locked loop providing a synchronization signal in phase with the recorded data and having a frequency corresponding to the density rate associated with the control signal.

3. The improvement of claim 2 wherein the phase locked loop includes a variable frequency oscillator which operates at a nominal frequency or bit rate which is at least as high as the highest density rate of said set of density rates, and wherein the other available density rates in said set of density rates are integral sub-multiples of said highest rate.

4. The improvement of claim 3 wherein said synchronization signal is provided by the output of a frequency divider which is driven by the output of the variable frequency oscillator of the phase locked loop.

5. In apparatus for reading data from a rotating magnetic disk whereon binary data has been recorded on a plurality of data fields, each of said data fields having data thereon recorded at a known density rate selected from among a set of available density rates, the improvement comprising:
  means responsive to a control signal for reading each of said data fields independently of the other data fields, at one of said available rates;
  said control signal comprising one signal selected from among a plurality of available signals, each of which is associated with one of said available density rates;
  the means for reading including a phase locked loop for synchronously detecting the recorded data;
  the phase locked loop including a variable frequency oscillator which operates at a nominal frequency or bit rate which is at least as high as the highest density rate of the set of density rates, and wherein the other available density rates in said set of density rates are integral submultiples of the highest rate;
  the phase locked loop providing a synchronization signal in phase with the recorded data and having a frequency corresponding to the density rate associated with the control signal, the synchronization signal being provided by the output of a frequency divider which is driven by the output of the variable frequency oscillator, the frequency divider comprising a divide-by-N counter including means for selecting the division factor N responsive to said control signal.

6. The improvement of claim 5 wherein each data field is preceded by a data mark byte and the value of the division factor N is changeable only at the end of the data mark byte.

7. The improvement of claim 6 wherein the phase lock loop is adapted for operation at a first, higher gain or a second, lower gain responsive to the first and second states, respectively, of a phase lock loop gain selection signal; and further including means for providing the phase lock loop gain selection signal in the first state to select the first, higher gain while phase lock is being acquired and to provide the phase lock loop gain selection signal in the second state to select the second, lower gain after phase lock has been acquired.

8. The improvement of claim 7 wherein said apparatus is further adapted for reading data from a rotating magnetic disk whereon binary data has been recorded on a sector format, each sector including a least a data field on which variable data may be recorded and a preamble portion of predetermined content and duration preceding said data field, the phase lock loop gain selection signal being provided in said first state during the time of at least part of the preamble and being provided in the second state while the data field is read.

9. The improvement of any of claims 2, 3, 4, 6 or 5 wherein the phase lock loop includes a voltage controlled oscillator the output frequency of which is responsive to a voltage control signal applied thereto; means for inhibiting the output of the voltage controlled oscillator responsive to an inhibit signal applied thereto; a phase error detector for providing a phase error signal indicative of the phase error between the output of the voltage controlled oscillator and a reference synchronization signal; a low pass filter for providing the voltage control signal for the voltage controlled oscillator responsive to the phase error signal; and the low pass filter including a filter-response-determining capacitor and means for discharging the capacitor responsive to the inhibit signal, whereby after the inhibit signal is first present and then released, the low pass filter output initially represents zero phase error and on the second bit of the reference synchronization signal, the phase error signal represents the actual phase error between the reference synchronization signal and the output of the voltage controlled oscillator.

10. The improvement of claim 9 wherein the low pass filter is adapted to operate at a first, higher gain or a second, lower gain responsive to the state of a gain selection signal, the first, higher gain being selected when the gain control signal is in a first state and the second, lower gain being selected when the gain selection signal is in a second state.

11. The improvement of claim 10 wherein the voltage controlled oscillator output is in the form of a digital pulse train and the reference synchronization signal is also in the form of a digital pulse train, said pulse trains having normally the same frequency but varying in relative phase, and the phase error detector further comprising:
  A. means for comparing the phase of a pulse in the voltage controlled oscillator output signal with a corresponding pulse in the reference synchronization signal;
  B. means for providing an output signal of a first type responsive to the detection of said pulse in the reference synchronization signal prior to the detection of the corresponding pulse in the voltage controlled oscillator output signal;
  C. means for providing an output signal of a second type responsive to the detection of said pulse in the voltage controlled oscillator output signal prior to the corresponding pulse in the reference synchronization signal; and
  D. said means for providing the output signal of the second type including means for suppressing the output signal of the second type until the detection of the corresponding pulse in the reference synchronization signal, whereby the output signal of the second type is not provided until and unless the corresponding pulse in the reference synchronization signal is detected.

12. A phase error detector for use in a phase locked loop for comparing the phase difference between a pair of signals comprising digital pulse trains having nominally the same frequency but varying in relative phase, the phase error detector comprising
  (a) means for comparing the phase of a pulse in the first pulse train with a corresponding pulse in the second pulse train;
  (b) means for providing an output signal of a first type responsive to the detection of said pulse in the first pulse train prior to the detection of the corresponding pulse in the second pulse train;

(c) means for providing an output signal of a second type responsive to the detection of said pulse in the second pulse train prior to the corresponding pulse in the first pulse train; and (d) said means for providing the output signal of the second type including means for suppressing the output signal of the second type until the detection of the corresponding pulse in the first pulse train, whereby the output signal of the second type is not provided until and unless the corresponding pulse in the first pulse train is detected.

13. The phase error detector of claim 12 wherein the means for providing an output signal of the second type includes means for charging a capacitor at a fixed rate from the time a pulse is detected in the second pulse train until the corresponding pulse is detected in the first pulse train, and means for discharging said capacitor at the same fixed rate starting at the time that said corresponding pulse in the first pulse train is detected, whereby the output signal of the second type is provided only during the time the capacitor is discharging, such time being representative of the phase error between said pulses.

14. The apparatus of either of claims 12 or 13 wherein the pulses in the first and second pulse trains are detected at the leading edges thereof and the first and second type output signals are provided independently of the width of the pulses in the first and second pulse trains.

15. The apparatus of claim 12 wherein the phase error detector thereof is operable over a range of $-180°$ to $+180°$ of phase error.

16. An apparatus for reading data from a magnetic disk whereon binary data has been recorded on a plurality of data fields, each of said data fields having data thereon recorded at a known density rate selected from among a set of available substantially differing density rates, and including means for reading the data recorded in each data field at said known density rate, the means for reading including a phase locked loop for synchronously detecting the recorded data, the phase locked loop providing a synchronization signal locked in phase with the recorded data and, for each data field, having a frequency corresponding to the density rate of the data recorded therein, the improvement comprising:

the phase locked loop including a phase error detector for comparing the phase difference between a pair of signals comprising digital pulse trains having nominally the same frequency but varying in relative phase, such phase error detector comprising:

A. means for comparing the phase of a pluse in the first pulse in the first pulse train with a corresponding pulse in the second pulse train;

B. means for providing an output signal of a first type responsive to the detection of said pulse in the first pulse train prior to the detection of corresponding pulse in the second pulse train;

C. means for providing an output signal of a second type responsive to the detection of said pulse in the second pulse train prior to the corresponding pulse in the first pulse train; and D. said means for providing the output signal of the second type including means for suppressing the output signal of the second type until the detection of the corresponding pulse in the first pulse train, whereby the output signal of the second type is not provided until and unless the corresponding pulse in the first pulse train is detected.

17. The disk reader of claim 16 wherein the means for providing an output signal of the second type includes means for charging a capacitor at a fixed rate from the time a pulse is detected in the second pulse train until the corresponding pulse is detected in the first pulse train, and means for discharging said capacitor at the same fixed rate starting at the time that said corresponding pulse in the first pulse train is detected, whereby the output signal of the second type is provided only during the time the capacitor is discharging, such time being representative of the phase error between said pulses.

18. The apparatus of either of claims 16 or 17 wherein the pulses in the first and second pulse trains are detected at the leading edges thereof and the first and second type output signals are provided independently of the width of the pulses in the first and second pulse trains.

19. The apparatus of claim 16 wherein the phase error detector thereof is operable over a range of $-180$ degrees to $+180$ degrees of phase error.

* * * * *

Disclaimer 4,231,071.—*Albert L. Anderson*, Lexington, Mass. READER FOR DATA RECORDED ON MAGNETIC DISKS AT PLURAL DENSITIES. Patent dated Oct. 28, 1980. Disclaimer filed Dec. 1, 1980, by the assignee, *Digital Equipment Corp.*

Hereby enters this disclaimer to claims 12, 13, 16 and 17 of said patent.

[*Official Gazette December 15, 1981.*]

UNITED STATES PATENT AND TRADEMARK OFFICE
CERTIFICATE OF CORRECTION

PATENT NO. : 4,231,071

DATED : October 28, 1980

INVENTOR(S) : Albert L. Anderson

Page 1 of 2

It is certified that error appears in the above-identified patent and that said Letters Patent are hereby corrected as shown below:

```
Column 1, line 66, delete "is".
Column 3, line 23, delete "i.e.,(" and insert --(i.e.,--.
Column 3, line 26, delete "loose" and insert --lose--.
Column 3, line 67, delete "Fig." and insert --Figs.--.
Column 7, line 51, before "least" insert --at--.
Column 7, line 68, delete "funsity" and insert --density--.
Column 8, line 34, after "134" insert --which--.
Column 9, line 59, delete "fat" and insert --fact--.
Column 10, line 39, delete "technique" and insert --Technique--.
Column 11, line 59, delete "charge" and insert --change--.
Column 12, line 35, delete "flip flop" insert --flip-flop--.
Column 12, line 53, delete "(Q)" and insert --($\bar{Q}$)--.
Column 14, line 35, delete "Q" and insert --$\bar{Q}$--.
Column 14, line 47, delete "of" and insert --off--.
Column 14, line 60, delete "$\overline{508}$" and insert --508--.
Column 14, line 61, delete "CLK" and insert --$\overline{CLK}$--.
Column 15, line 11, delete "CLK signal. The $\overline{CLK}$" and insert
         --$\overline{CLK}$ signal. The CLK--
Column 15, line 58, delete "acoos" and insert --across--.
Column 16, line 25, delete "go" and insert --goes--.
Column 17, line 43, delete "a".
Column 18, line 17, delete "$\overline{INHIBIT}$" and insert --INHIBIT--.
Column 18, line 18, delete "INHIBIT" and insert --$\overline{INHIBIT}$--.
Column 18, line 23, delete "and," and insert --hand,--.
Column 20, line 18, delete "its" and insert --bits--.
Column 20, line 19, delete "provide" and insert --provides--.
Column 21, line 36, delete "preable" and insert --preamble--.
```

UNITED STATES PATENT AND TRADEMARK OFFICE
CERTIFICATE OF CORRECTION

PATENT NO. : 4,231,071
DATED : October 28, 1980
INVENTOR(S) : Albert L. Anderson It is certified that error appears in the above-identified patent and that said Letters Patent are hereby corrected as shown below:

Column 22, line 19, delete "$\bar{Q}$" and insert --$\underset{=}{Q}$--.
Column 22, line 20, delete "Q" and insert --$\bar{Q}$--.
Column 23, line 62, delete "a" and insert --at--.

Signed and Sealed this

Second Day of March 1982

[SEAL]

Attest:

GERALD J. MOSSINGHOFF

Attesting Officer   Commissioner of Patents and Trademarks